US011601306B2

United States Patent
Ernström

(10) Patent No.: US 11,601,306 B2
(45) Date of Patent: Mar. 7, 2023

(54) CHANNEL ESTIMATION IN A WIRELESS COMMUNICATION SYSTEM

(71) Applicant: Telefonaktiebolaget LM Ericsson (publ), Stockholm (SE)

(72) Inventor: Per Ernström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 203 days.

(21) Appl. No.: 17/264,471

(22) PCT Filed: Jul. 9, 2019

(86) PCT No.: PCT/SE2019/050682
§ 371 (c)(1),
(2) Date: Jan. 29, 2021

(87) PCT Pub. No.: WO2020/032855
PCT Pub. Date: Feb. 13, 2020

(65) Prior Publication Data
US 2021/0320823 A1    Oct. 14, 2021

Related U.S. Application Data

(60) Provisional application No. 62/714,797, filed on Aug. 6, 2018.

(51) Int. Cl.
*H04L 25/02* (2006.01)
(52) U.S. Cl.
CPC ...... *H04L 25/0224* (2013.01); *H04L 25/0212* (2013.01)
(58) Field of Classification Search
CPC .................. H04L 25/0224; H04L 25/0212
See application file for complete search history.

(56) References Cited

U.S. PATENT DOCUMENTS

2002/0146044 A1\* 10/2002 Esmailzadeh ........ H04B 1/7103
370/542
2006/0072682 A1\* 4/2006 Kent .................. H04L 25/0214
375/267

(Continued)

FOREIGN PATENT DOCUMENTS

WO     2017078594 A1     5/2017

OTHER PUBLICATIONS

CMCC, "New WID on NR support for high speed train scenario", 3GPP TSG RAN Meeting #82, RP-182512, Sorrento, Italy, Dec. 10-13, 2018, 1-4.

(Continued)

*Primary Examiner* — Zhiren Qin
(74) *Attorney, Agent, or Firm* — Murphy, Bilak & Homilier, PLLC

(57) ABSTRACT

Radio equipment (10) is configured for tap separated channel estimation in a wireless communication system. The radio equipment (10) obtains a channel estimate (16) of a radio channel over which a reference signal (12) is received, and separates the channel estimate (16) into channel estimate components (20) that correspond to respective channel taps (22). The radio equipment (10) then compensates the channel estimate components (20) for Doppler shifts respectively associated with the channel taps (22) to which the channel estimate components (20) correspond. The radio equipment (10) processes the compensated channel estimate components (32) separately. Such processing comprises filtering, interpolating, and/or extrapolating. The radio equipment (10) then de-compensates the processed channel estimate components (34) for the respective Doppler shifts, and forms a combined channel estimate (42) of the radio channel by combining the de-compensated channel estimate components (38).

20 Claims, 27 Drawing Sheets

(56) References Cited

U.S. PATENT DOCUMENTS

| | | | |
|---|---|---|---|
| 2006/0171283 A1* | 8/2006 | Vijayan | H04L 1/0045 369/94 |
| 2009/0075700 A1* | 3/2009 | Fukuoka | H04B 7/0894 455/561 |
| 2010/0232384 A1* | 9/2010 | Farajidana | H04L 5/005 370/329 |
| 2014/0211892 A1 | 7/2014 | Guo et al. | |
| 2016/0211959 A1 | 7/2016 | Jöngren et al. | |
| 2017/0099175 A1* | 4/2017 | Tian | H04L 27/2647 |
| 2017/0257246 A1* | 9/2017 | Zhuang | H04L 7/0058 |
| 2018/0183509 A1* | 6/2018 | Luo | H04B 7/01 |
| 2018/0294996 A1 | 10/2018 | Sorrentino et al. | |
| 2019/0158248 A1* | 5/2019 | Sakamoto | H04L 5/0051 |

OTHER PUBLICATIONS

CMCC, "Motivation for NR support for High speed train scenario", 3GPP TSG RAN Meeting #82, R4-182513, Sorrento, Italy, Dec. 10-13, 2018, 1-3.

Proakis, John G., "Digital Communications through Fading Multipath Channels", Digital Communications, McGrawHill, 4th edition, NY, Chapter 14, 2001, 1-937.

\* cited by examiner

TRANSMITTING TO RADIO NETWORK EQUIPMENT SIGNALING INDICATING WHETHER OR NOT THE USER EQUIPMENT HAS A CERTAIN CAPABILITY
410

PERFORMING TAP SEPARATED CHANNEL ESTIMATION IN ACCORDANCE WITH THE SIGNALING
420

Figure 14

RECEIVING FROM RADIO NETWORK EQUIPMENT SIGNALING INDICATING WHETHER OR NOT THE USER EQUIPMENT IS TO PERFORM TAP SEPARATED CHANNEL ESTIMATION, MEET A CERTAIN DEMODULATION PERFORMANCE REQUIREMENT, OR PERFORM CHANNEL ESTIMATION USING A CERTAIN REFERENCE SIGNAL
510

PERFORMING TAP SEPARATED CHANNEL ESTIMATION IN ORDER TO COMPLY WITH THE SIGNALING FROM THE RADIO NETWORK EQUIPMENT
520

Figure 15

CHANNEL ESTIMATION IN A WIRELESS COMMUNICATION SYSTEM

TECHNICAL FIELD

The present application relates generally to a wireless communication system, and relates more particularly to channel estimation in such a wireless communication system.

BACKGROUND

A fading multipath channel can be modelled as a number of multipath radio rays taking different paths between a transmitter and a receiver, e.g. through scattering against buildings or other objects. The different rays could also come from different transmission points transmitting the same signal, e.g., in the case of a single frequency network (SFN) transmission from multiple remote radio heads (RRHs). The different rays interfere with each other, enhancing or cancelling each other, creating a fading pattern in time. The radio channel can thus be considered constant only over time periods smaller than the coherence time of the channel.

In radio communication over a fading multipath channel, a reference signal known to the receiver is typically used by the receiver to estimate the channel. To save overhead, the reference symbols of the reference signal are typically not present in every symbol in time. Instead, the receiver interpolates and/or extrapolates channel estimates in time. In order to suppress noise, the receiver may also filter (e.g., average) the channel estimates over time.

But such channel estimate interpolation, extrapolation, and/or filtering introduces channel estimation errors when performed over time intervals over which the channel is varying, i.e. over time periods larger than the coherence time of the channel. This proves particularly problematic in high mobility scenarios where the transmitter and/or receiver move at high speeds, e.g., due to the transmitter and/or receiver being on a high-speed train. Indeed, the high mobility shortens the channel coherence time and exacerbates errors attributable to channel estimate filtering, interpolation, and extrapolation.

High mobility can to some extent be accommodated for by configuring reference signal patterns with higher reference symbol time density. This does, however, come at the cost of increased reference signal overhead. Also, for very high speeds, performance is severely impacted even for reference signal patterns with very high reference symbol time density.

SUMMARY

Some embodiments herein filter, interpolate, extrapolate, or otherwise process tap-specific components of a channel estimate separately, after having compensated those components for respective tap-specific Doppler shifts. Such compensation may for instance remove or at least reduce tap-specific time-varying phases whose introduction into the components is attributable to the tap-specific Doppler shifts being different (i.e., the doppler spread). This in turn removes or at least reduces the errors that the time-varying phases would have otherwise introduced upon performing channel estimate filtering, interpolating, extrapolating, or other processing over time periods larger than the channel coherence time. Some embodiments thereby improve channel estimate quality and data throughput for any given reference symbol time density and/or reduce reference signal overhead while preserving channel estimate quality and data throughput.

More particularly, embodiments herein include a method performed by radio equipment (e.g., a user equipment or radio network equipment) for tap separated channel estimation in a wireless communication system. The method comprises obtaining a channel estimate of a radio channel over which a reference signal is received. The method may also comprise separating the channel estimate into channel estimate components that correspond to respective channel taps. The method may further comprise compensating the channel estimate components for Doppler shifts respectively associated with the channel taps to which the channel estimate components correspond. The method may also comprise processing the compensated channel estimate components separately, wherein said processing comprises filtering, interpolating, and/or extrapolating. In some embodiments, the method further comprises de-compensating the processed channel estimate components for the respective Doppler shifts, and forming a combined channel estimate of the radio channel by combining the de-compensated channel estimate components. In some embodiments, the method may further include demodulating a data signal using the combined channel estimate.

In some embodiments, the method further comprises estimating respective frequencies for the channel taps. In this case, compensating the channel estimate components may comprise performing time-dependent phase rotation of the channel estimate components using the frequencies respectively estimated for the channel taps to which the channel estimate components correspond. For example, performing time-dependent phase rotation of the channel estimate components may comprise multiplying each channel estimate component for symbol n by a respective phase $e^{-i \cdot 2\pi \cdot (f_i^{est} - F_d) \cdot t_n}$, where $f_i^{est}$ is the frequency respectively estimated for the channel tap i to which the channel estimate component corresponds and $F_d$ is a frequency with which the received signal is down-converted to baseband.

Alternatively or additionally, in some embodiments, separating the channel estimate may comprise obtaining an impulse response from the channel estimate, separating the impulse response into tap-specific impulse responses that respectively correspond to the channel taps, and obtaining the channel estimate components that respectively correspond to channel taps by transforming the tap-specific impulse responses into a frequency domain. In other embodiments, separating the channel estimate may comprise applying tap separation filters, corresponding to the respective channel taps, to the channel estimate.

In any of the embodiments, the method may comprise identifying the channel taps from an impulse response calculated based on the reference signal, or a different reference signal, received over the radio channel. In one embodiment in which the channel taps are identified from an impulse response calculated based on the different reference signal, the different reference signal may be a tracking reference signal, a channel state information reference signal, a sounding reference signal, or a cell-specific reference signal. Regardless, identifying the channel taps may comprise dividing a time interval of the impulse response into multiple time segments and treating one or more components of the impulse response corresponding to one or more of the time segments as one or more of the channel taps.

In any event, in some embodiments, at least one of the channel estimate components corresponds to multiple channel taps with Doppler shifts that differ from one another by an amount less than a threshold.

In some embodiments, the reference signal is a demodulation reference signal or a cell-specific reference signal.

The method in some embodiments includes transmitting capability signaling to radio network equipment. The signaling may for instance indicate that the radio equipment is capable of tap separated channel estimation. Or the signaling may indicate that the radio equipment is capable of meeting a certain demodulation performance requirement while the radio equipment is moving at a speed within a certain range, wherein the radio equipment is configured to perform tap separated channel estimation while moving at a speed within the certain range. In still other embodiments, the signaling may indicate that the radio equipment is capable of performing channel estimation using a certain one of multiple possible reference signal patterns with different respective time domain reference symbol densities, wherein the radio equipment is configured to perform tap separated channel estimation when the reference signal received has the certain reference signal pattern.

Alternatively or additionally, the method may include receiving signaling from radio network equipment. The signaling may for instance indicate that the radio equipment is to perform tap separated channel estimation. Or, the signaling may indicate that the radio equipment is to meet a certain demodulation performance requirement while the radio equipment is moving at a speed within a certain range, wherein the radio equipment is configured to perform tap separated channel estimation while moving at a speed within the certain range. In other embodiments, the signaling may indicate that the radio equipment is to perform channel estimation using a certain one of multiple possible reference signal patterns with different respective time domain reference symbol densities, wherein the radio equipment is configured to perform tap separated channel estimation when the reference signal received has the certain reference signal pattern.

Embodiments herein also include a method performed by a user equipment configured for use in a wireless communication system in accordance with other particular embodiments. The method includes transmitting to radio network equipment signaling indicating whether or not the user equipment has a certain capability. The certain capability may include tap separated channel estimation, e.g., as described above in which the user equipment compensates channel estimate components for Doppler shifts respectively associated with channel taps to which the channel estimate components correspond and filters, interpolates, and/or extrapolates the compensated channel estimate components separately. Or, the certain capability may include meeting a certain demodulation performance requirement while the user equipment is moving at a speed within a certain range, wherein the user equipment is configured to perform tap separated channel estimation while moving at a speed within the certain range. Or, the certain capability may include performing channel estimation using a certain one of multiple possible reference signal patterns with different respective time domain reference symbol densities, wherein the user equipment is configured to perform tap separated channel estimation when the reference signal received has the certain reference signal pattern. Regardless, in some embodiments, the method further includes performing tap separated channel estimation in accordance with the signaling.

Embodiments further include a method performed by a user equipment configured for use in a wireless communication system in accordance with other particular embodiments. The method includes receiving from radio network equipment signaling indicating whether or not the user equipment is to perform tap separated channel estimation, meet a certain demodulation performance requirement, or perform channel estimation using a certain reference signal. The tap separated channel estimation is, e.g., as described above in which the user equipment compensates channel estimate components for Doppler shifts respectively associated with channel taps to which the channel estimate components correspond and filters, interpolates, and/or extrapolates the compensated channel estimate components separately. The certain demodulation performance requirement may be a certain demodulation performance requirement while the user equipment is moving at a speed within a certain range, wherein the user equipment is configured to perform tap separated channel estimation while moving at a speed within the certain range. And the certain reference signal pattern may be one of multiple possible reference signal patterns with different respective time domain reference symbol densities, wherein the user equipment is configured to perform tap separated channel estimation when the reference signal received has the certain reference signal pattern. In some embodiments, the method further includes performing tap separated channel estimation in order to comply with the signaling from the radio network equipment.

Embodiments also include a method performed by a radio network equipment configured for use in a wireless communication system in accordance with other particular embodiments. The method includes receiving from a user equipment signaling indicating whether or not a user equipment has a certain capability. The certain capability may include tap separated channel estimation, e.g., as described above in which the user equipment compensates channel estimate components for Doppler shifts respectively associated with channel taps to which the channel estimate components correspond and filters, interpolates, and/or extrapolates the compensated channel estimate components separately. Or, the certain capability may include meeting a certain demodulation performance requirement while the user equipment is moving at a speed within a certain range. Or the certain capability may include performing channel estimation using a certain one of multiple possible reference signal patterns with different respective time domain reference symbol densities. Regardless, the method in some embodiments may further include determining, based on the received signaling and from multiple possible reference signal patterns with different respective time domain reference symbol densities, a reference signal pattern of a reference signal to transmit to the user equipment. In one embodiment, for instance, such determination may comprise determining that the reference signal is to have a reference signal pattern with a relatively lower or higher time domain reference symbol density depending respectively on whether or not the signaling indicates the user equipment has the certain capability. Regardless, the method may also include transmitting the reference signal with the determined reference signal pattern to the user equipment.

Embodiments further include a method performed by a radio network equipment configured for use in a wireless communication system in accordance with other particular embodiments. The method includes transmitting from the radio network equipment to a user equipment signaling indicating that the user equipment is to perform tap separated channel estimation, meet a certain demodulation performance requirement, or perform channel estimation using a certain reference signal. The tap separated channel estimation is, e.g., as described above in which the user equipment compensates channel estimate components for Doppler shifts respectively associated with channel taps to which the channel estimate components correspond and filters, interpolates, and/or extrapolates the compensated channel estimate components separately. The certain demodulation performance requirement may be a certain demodulation performance requirement that is capable of being met while the user equipment is moving at a speed within a certain range (e.g., by the user equipment performing tap separated channel estimation). And the certain reference signal pattern may be one of multiple possible reference signal patterns with different respective time domain reference symbol densities, wherein the user equipment is configured to perform tap separated channel estimation when the reference signal received has the certain reference signal pattern. In some embodiments, the method further includes determining to transmit the signaling, e.g., based on one or more of capability signaling received from the user equipment, information characterizing mobility of the user equipment and/or a speed of the user equipment, or information characterizing a type of deployment or coverage area of the radio network equipment.

Embodiments also include corresponding apparatus, computer programs, and carriers. For example, embodiments include radio equipment (e.g., a user equipment or radio network equipment) configured for tap separated channel estimation in a wireless communication system. The radio equipment is configured (e.g., via communication circuitry and processing circuitry) to obtain a channel estimate of a radio channel over which a reference signal is received. The radio equipment may also be configured to separate the channel estimate into channel estimate components that correspond to respective channel taps, and to compensate the channel estimate components for Doppler shifts respectively associated with the channel taps to which the channel estimate components correspond. The radio equipment may also be configured to process the compensated channel estimate components separately, where such processing comprises filtering, interpolating, and/or extrapolating. In some embodiments, the radio equipment is further configured to de-compensate the processed channel estimate components for the respective Doppler shifts, and form a combined channel estimate of the radio channel by combining the de-compensated channel estimate components. In some embodiments, the radio equipment may further be configured to demodulate a data signal using the combined channel estimate.

Embodiments further include a radio network equipment configured for use in a wireless communication system in accordance with other particular embodiments. The radio network equipment is configured to receive from a user equipment signaling indicating whether or not a user equipment has a certain capability. The certain capability may include tap separated channel estimation, e.g., as described above in which the user equipment compensates channel estimate components for Doppler shifts respectively associated with channel taps to which the channel estimate components correspond and filters, interpolates, and/or extrapolates the compensated channel estimate components separately. Or, the certain capability may include meeting a certain demodulation performance requirement while the user equipment is moving at a speed within a certain range. Or the certain capability may include performing channel estimation using a certain one of multiple possible reference signal patterns with different respective time domain reference symbol densities. Regardless, the radio network equipment is configured in some embodiments to determine, based on the received signaling and from multiple possible reference signal patterns with different respective time domain reference symbol densities, a reference signal pattern of a reference signal to transmit to the user equipment. In one embodiment, for instance, such determination may comprise determining that the reference signal is to have a reference signal pattern with a relatively lower or higher time domain reference symbol density depending respectively on whether or not the signaling indicates the user equipment has the certain capability. Regardless, the radio network equipment may also be configured to transmit the reference signal with the determined reference signal pattern to the user equipment.

BRIEF DESCRIPTION OF THE DRAWINGS

FIG. 14 is a logic flow diagram of a method performed by a user equipment configured for use in a wireless communication system in accordance with some embodiments.

FIG. 15 is a logic flow diagram of a method performed by a user equipment configured for use in a wireless communication system in accordance with other particular embodiments.

DETAILED DESCRIPTION

Figure 1:
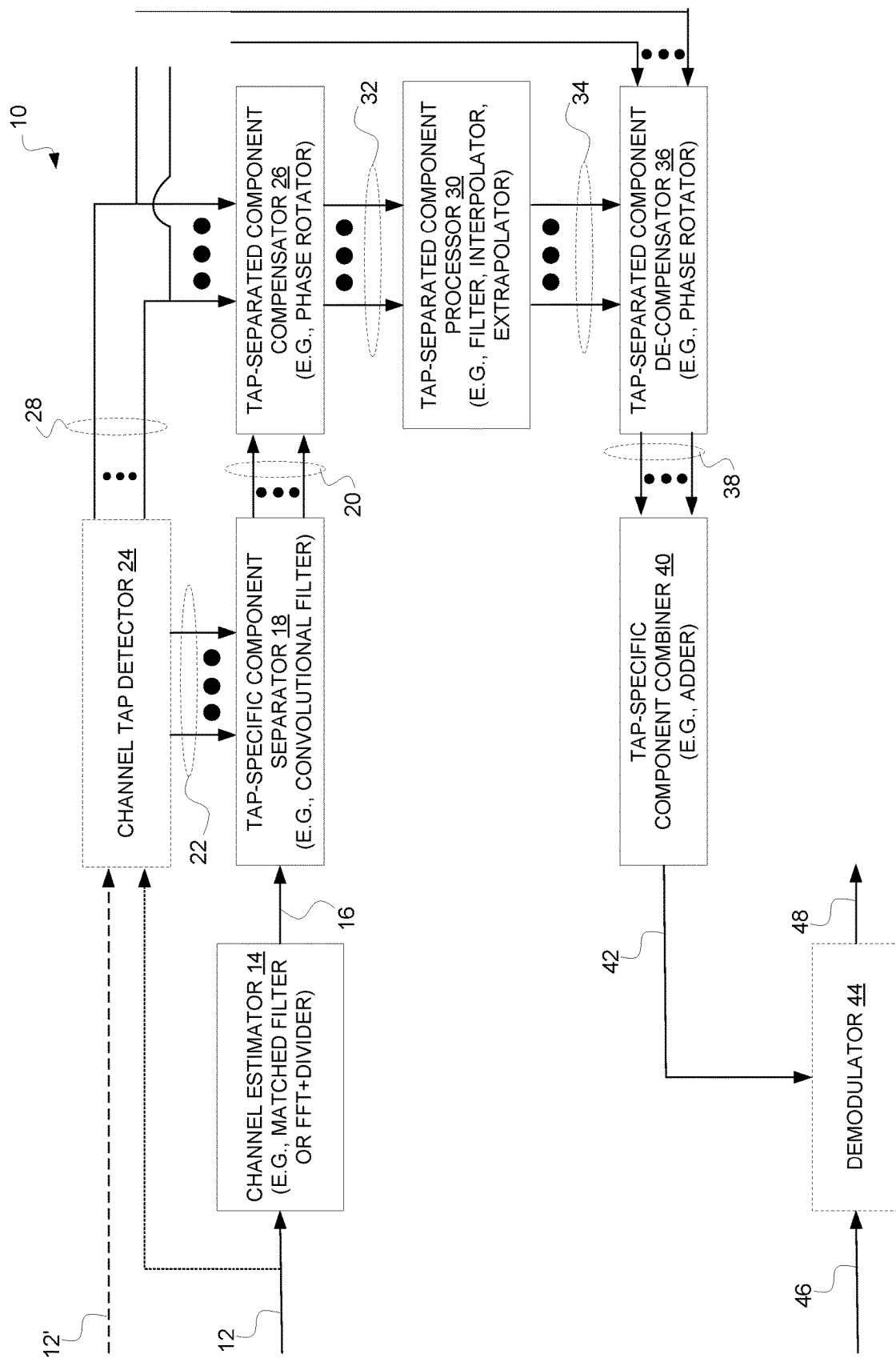
FIG. 1 is a block diagram of radio equipment configured for channel estimation according to some embodiments.

FIG. 1 shows processing performed by radio equipment 10 for channel estimation according to some embodiments. The radio equipment 10 may be for instance a user equipment (UE) or radio network equipment (e.g., a base station) configured for use in a wireless communication system.

As shown, the radio equipment 10 is configured to estimate a radio channel over which a reference signal 12 is received. The reference signal 12 may for instance be a demodulation reference signal (DMRS) or a cell-specific reference signal (CRS). In some embodiments, the radio equipment 10 itself received the reference signal 12 over the radio channel (e.g., using one or more antennas of the radio equipment 10). In other embodiments, the radio equipment 10 instead received the reference signal 12 from remote equipment (e.g., one or more remote radio heads) that received the reference signal 12 over the radio channel. The radio equipment 10 in either case may be considered to have received the reference signal 12 as shown in FIG. 1. Although not shown, the radio equipment 10 (or any remote equipment) may pre-process the reference signal 12 (e.g., down-convert, filter, etc.) to condition the reference signal 12 for use in channel estimation.

To estimate the radio channel, the radio equipment 10 includes a channel estimator 14 that is configured to obtain a channel estimate 16 of the radio channel over which the reference signal 12 is received. The channel estimator 14 may for instance perform matched filtering to known reference symbols of the reference signal 12. Alternatively, the channel estimator 14 may perform a Fast Fourier Transform (FFT) and divide the received symbols of the reference signal 12 by the corresponding known transmitted symbols. Regardless, in some embodiments, the channel estimate 16 is a raw channel estimate, whereas in other embodiments the channel estimate 16 is processed (e.g., filtered) to some extent by the channel estimator 14.

The radio equipment 10 further includes a tap-specific component separator 18. The tap-specific component separator 18 is configured to separate the channel estimate 16 into channel estimate components 20 that correspond to respective channel taps 22, e.g., as detected by channel tap detector 24 from the reference signal 12 or a different reference signal 12'. In embodiments where the channel taps 22 are detected from a different reference signal 12', the different reference signal 12' may for instance be a channel state information (CSI) reference signal (CSI-RS), a sounding reference signal (SRS), a tracking reference signal (TRS), or a cell-specific reference signal (CRS), any of which may also generally be referred to as a tap identification reference signal (TIRS). Regardless, the channel estimate components 20 may in some embodiments then be tap-specific components that correspond to different (multipath) radio rays, e.g., so as to characterize components of the radio channel over which respective radio rays were received. In one or more embodiments, for example, the tap-specific component separator 18 exploits the difference in signal delays of the different (multipath) radio rays to separate the raw channel estimate 16 into the channel estimate components 20 corresponding to respective channel taps 22.

The radio equipment 10 as shown also includes a tap-separated component compensator 26. The tap-separated component compensator 26 is configured to compensate the channel estimate components 20 for Doppler shifts respectively associated with the channel taps 22 to which the channel estimate components 20 correspond. That is, for each of the channel estimate components 20, the tap-separated component compensator 26 compensates that component for the Doppler shift associated with the channel tap to which the component corresponds. The tap-separated component compensator 26 with this compensation produces compensated channel estimate components 32.

The tap-separated component compensator 26 may for instance compensate the channel estimate components 20 as a function of frequencies 28 estimated for the respective channel taps 22, e.g., which account for the Doppler shifts experienced at the channel taps 22. In one embodiment, for example, the tap-separated component compensator 26 is a phase rotator that performs (time-dependent) phase rotation of the channel estimate components using the frequencies 28 estimated for the respective channel taps 22. More specifically, time-dependent phase rotation may entail multiplying each channel estimate component 20 for symbol n by a respective phase $e^{-i \cdot 2\pi \cdot (f_i^{est} - F_d) \cdot t_n}$, where $f_i^{est}$ is the frequency 28 respectively estimated for the channel tap i to which the channel estimate component 20 corresponds and $F_d$ is a frequency with which the received signal 12 is down-converted to baseband. In these and other embodiments, compensation may remove or at least reduce tap-specific time-varying phases whose introduction into the components 20 is attributable to the Doppler shifts at the channel taps 22 being different (i.e., the Doppler spread). In these and other embodiments, the compensation may thereby remove or at least reduce the errors that the time-varying phases would have otherwise introduced upon performing channel estimate filtering, interpolating, extrapolating, or other processing over time periods larger than the channel coherence time.

In this regard, the radio equipment 10 as shown further includes a tap-separated component processor 30. The tap-separated component processor 30 is configured to process the compensated channel estimate components 32 separately. That is, each of the compensated channel estimate components 32 is processed on its own, i.e., independently without regard to other ones of the compensated channel estimate components 32. With the compensated channel estimate components 32 being tap-specific components, this means that channel estimate components are processed on a tap-by-tap basis. Processing by the tap-separated component processor 30 may include for instance filtering (e.g., averaging), interpolating, and/or extrapolating of the compensated channel estimate components 32. Such filtering, interpolating, and/or extrapolating may be performed for instance in a time domain with respect to the compensated channel estimate components 32, e.g., even over time periods larger than the channel coherence time as described above. Regardless, having processed the compensated channel estimate components 32 separately, the tap-separated component processor 30 outputs processed channel estimate components 34.

The radio equipment 10 as shown also includes a tap-separated component de-compensator 36. The tap-separated component de-compensator 36 de-compensates the processed channel estimate components 34 for the respective Doppler shifts, i.e., the Doppler shifts respectively associated with the channel taps 22 to which the processed channel estimate components 34 correspond. That is, the tap-separated component de-compensator 36 performs the inverse of the tap-separated component compensator 26. The tap-separated component de-compensator 36 may for instance de-compensate the processed channel estimate components 34 as a function of the same frequencies 28 estimated for the respective channel taps 22. In one embodiment, for example, tap-separated component de-compensator 36 is a phase rotator that performs (time-dependent) phase rotation of the channel estimate components using the frequencies 28 estimated for the respective channel taps 22. Such de-compensation may re-introduce the same tap-specific time-varying phases whose introduction into the pre-compensated components 20 was attributable to the Doppler shifts at the channel taps 22 being different. Regardless, this de-compensation produces de-compensated channel estimate components 38.

The radio equipment 10 further includes a tap-specific component combiner 40. The tap-specific component combiner 40 is configured to combine the de-compensated channel estimate components 38 in order to form a combined channel estimate 42 of the radio channel. In some embodiments, for instance, the tap-specific component combiner 40 includes an adder that simply adds the de-compensated channel estimate components 38 together.

With tap separated compensation having removed or at least reduced the errors that would have otherwise been introduced upon performing channel estimate processing (e.g., filtering, interpolating, extrapolating) overtime periods larger than the channel coherence time, the combined channel estimate 42 according to some embodiments has improved channel estimate quality, at least for any given reference symbol time density. In other embodiments, the reference symbol time density and corresponding reference signal overhead may be reduced compared to approaches without tap separated channel estimation, while preserving the quality of the combined channel estimate 42.

This proves notable for example in embodiments where the combined channel estimate 42 is thereafter used by the radio equipment 10 by a demodulator 44 to demodulate a data signal 46, e.g., to produce a demodulated signal 48 for further processing (e.g., decoding, etc.). With improved channel estimate quality, demodulation using the combined channel estimate 42 increases throughput of the data signal 46 as compared to approaches without tap separated channel estimation. Alternatively, with reduced reference symbol time density, demodulation using the combined channel estimate 42 preserves the throughput of the data signal 46 as compared to approaches without tap separated channel estimation, while reducing reference signal overhead.

Figure 2A:
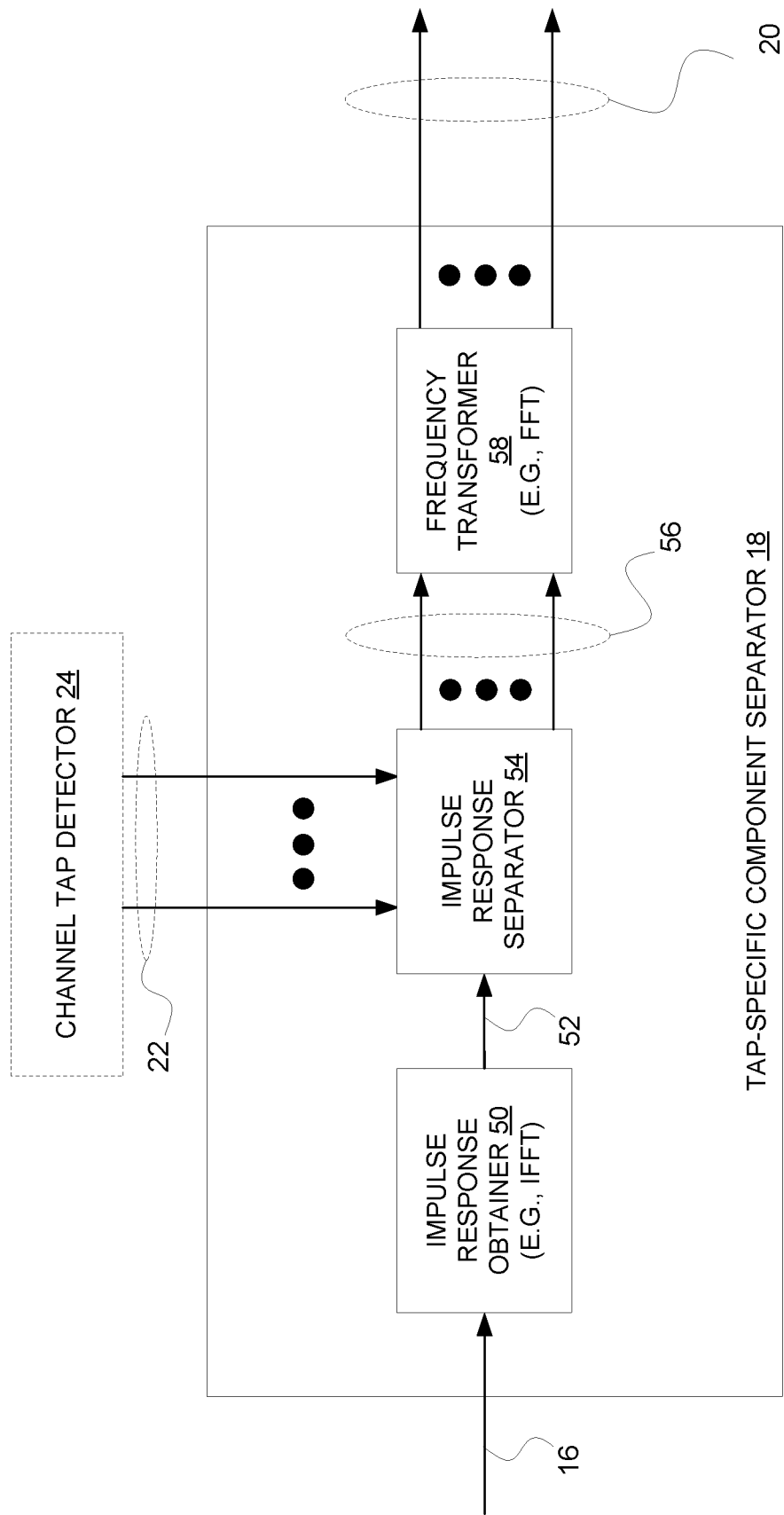
FIG. 2A is a block diagram of a tap-specific component separator according to some embodiments.

Note that separation of the channel estimate 16 into channel estimate components 20 may be accomplished by the tap-specific component separator 18 in any number of ways, e.g., in the time domain or the frequency domain. FIG. 2A for instance shows some embodiments in which the tap-specific component separator 18 separates the channel estimate 16 in the time domain.

As shown in FIG. 2A, the tap-specific component separator 18 includes an impulse response obtainer 50. The impulse response obtainer 50 obtains an impulse response 52 from the channel estimate 16. The impulse response obtainer 50 may for instance exploit the known structure of the reference signal's reference symbols in frequency (e.g., a comb structure) and perform an inverse fast fourier transfer (IFFT) or inverse discrete fourier transform (DFT) to obtain the corresponding impulse response 52 in the time domain. Regardless, the tap-specific component separator 18 as shown also includes an impulse response separator 54 that separates the impulse response 52 into tap-specific impulse responses 56 that respectively correspond to the channel taps 22. For example, the impulse response separator 54 may, for each channel tap 22, set the samples of the impulse response 52 to zero outside of that channel tap 22. No matter the particular way in which the impulse response 52 is separated, the tap-specific component separator 18 may also include a frequency transformer 58 configured to obtain the channel estimate components 58 that respectively correspond to the channel taps 22 by transforming the tap-specific impulse responses 56 into the frequency domain. The frequency transformer 58 may for instance perform a fast fourier transform (FFT) to transform the tap-specific impulse responses 56 back into the frequency domain.

Figure 2B:
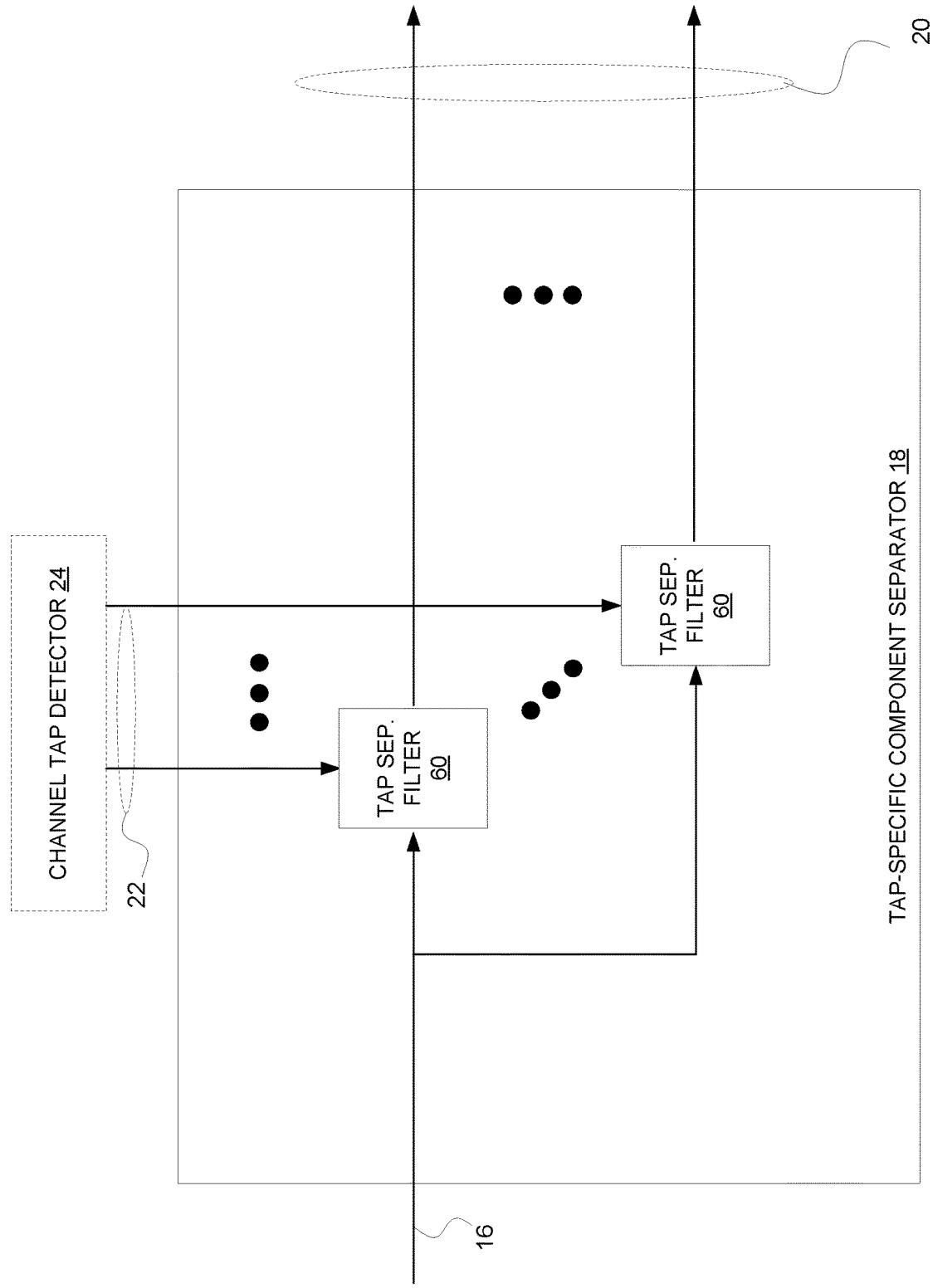
FIG. 2B is a block diagram of a tap-specific component separator according to other embodiments.

FIG. 2B illustrates still other embodiments in which the tap-specific component separator 18 separates the channel estimate 16 in the frequency domain. As shown, the tap-specific component separator 18 includes tap separation (sep) filters 60 (e.g., convolutional filters) corresponding to the channel taps 22. The tap separation filters 60 may for instance correspond to each of the channel taps' positions and widths, e.g., as identified by the channel tap detector 24. The tap-specific component separator 18 applies these tap separation filters 60, corresponding to the respective channel taps 22, to the channel estimate 16. The exact form of the tap separation filter may in some embodiments take into account the power profile of each channel tap 22.

Note further that the channel tap detector 24 may detect the channel taps 22 in any number of ways. In some embodiments, for instance, the channel tap detector 24 identifies the channel taps from an impulse response calculated based on the reference signal 12 or the different reference signal 12'. The channel tap detector 24 may for instance identify the start sample and the end sample in the impulse response that corresponds to each channel tap 22, e.g., with different tap delays. In rich scattering environments, though, there may be a multitude of rays that partly overlap in the time domain, making it difficult or impossible to separate them uniquely. In these and other embodiments, then, the channel tap detector 24 may divide a time interval of the impulse response into multiple time segments (e.g., of equal lengths) and treat one or more components of the impulse response corresponding to one or more of the time segments as one or more of the channel taps 22. The time interval may for instance be all or a portion of the time axis of the impulse response. The time interval may for example be a continuous time interval (e.g., as identified using the Akaike criterium) outside of which the channel estimate should be modelled only as noise (i.e., zero channel). Effectively removing or ignoring channel taps that contain only noise in this way may help to reduce computational load.

In other embodiments that reduce computational load in a different or additional way, at least one of the channel estimate components 20 (or compensated channel estimate components 32) corresponds to multiple channel taps with Doppler shifts that differ from one another by an amount less than a threshold. In one embodiment, for instance, channel estimate components 20 corresponding to channel taps 22 with similar Doppler shifts (e.g., that differ by less than the threshold) are combined before processing (e.g., filtering, interpolation, and/or extrapolation). The combination may for instance be performed by addition in either the time domain or the frequency domain. In other embodiments, such as those illustrated in FIG. 2B, a tap separation filter 60 may be a combined filter for the combined channel taps 22.

Figure 3B:
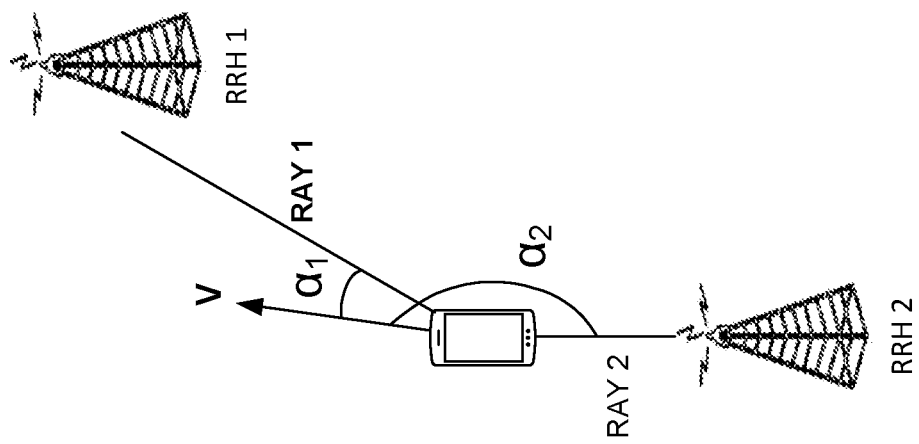
FIG. 3B is a block diagram of a single frequency network transmission from remote radio heads according to some embodiments.
Figure 3A:
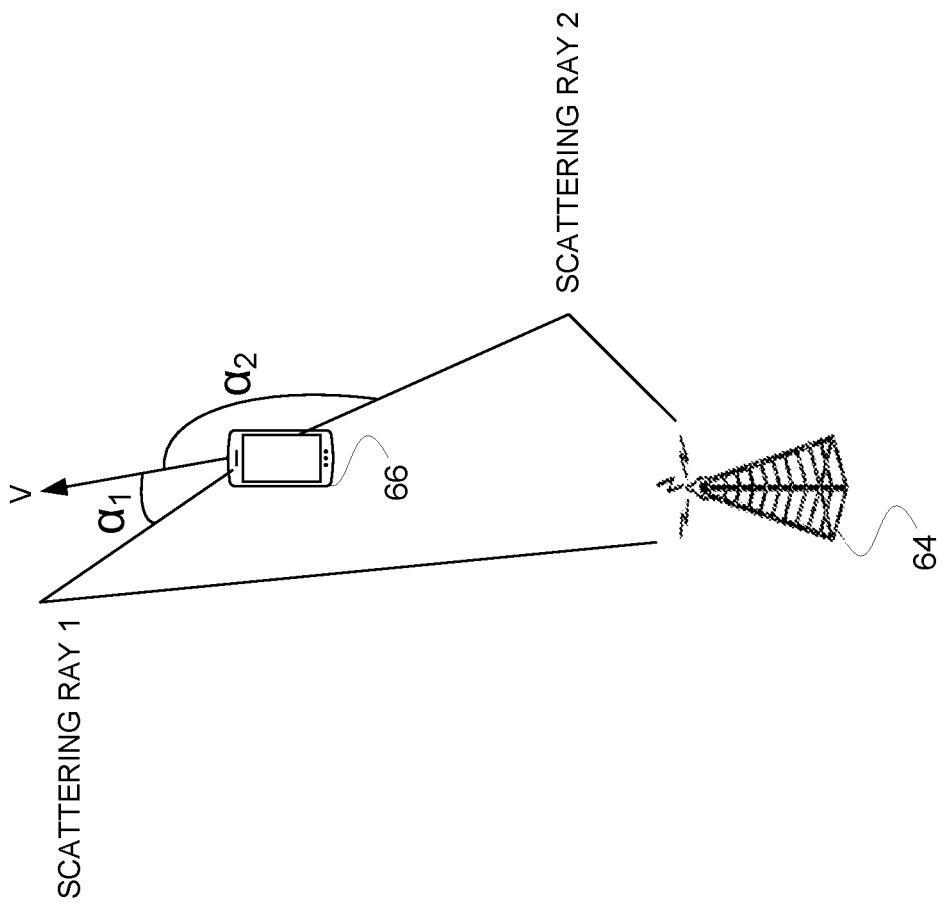
FIG. 3A is a block diagram of multipath fading between a transmitter and receiver according to some embodiments.

Consider now additional details of some embodiments herein. A fading multipath channel can be modelled as a number of multipath radio rays (e.g., ray i=1, 2, ..., n) taking different paths between the transmitter and the receiver, e.g. through scattering against buildings or other objects. FIG. 3A illustrates this in an example where the transmitter is a base station 64 and the receiver is a wireless device 66. In other embodiments, the different rays come from different transmission points transmitting the same signal (i.e. single frequency network (SFN) transmission from multiple remote radio heads (RRH) as in FIG. 3B). The contributing rays have different pathlengths di and thus different signal delays $$\tau_i = \frac{d_i}{c}.$$

Furthermore, the rays have different angles of arrival towards the receiver and thus also different angles $\alpha_i$ versus the direction of motion of the receiver. Consequently, the different rays also have different doppler shifts $$(\Delta f)_i = f_i - F_c = \frac{v}{c} \cdot F \cdot \cos(\alpha_i),$$

where v is the mobile terminal velocity, c is the speed of light and $F_c$ is the carrier frequency. The different rays interfere with each other, enhancing or cancelling each other, creating a fading pattern in time. The channel can thus be considered constant only over time periods smaller than the coherence time of the channel which can be calculated as the inverse of the doppler spread (a measure of the spread of the doppler shifts $(\Delta f)_i$).

In radio communication over fading multipath channels, reference signals known to the receiver side are typically used to estimate the channel. To save overhead, however, these reference symbols are often not present in every symbol in time. Thus, it's necessary to interpolate and/or to extrapolate channel estimates in time. In order to suppress noise, it's also common to average or filter the channel estimates over time. Channel estimate interpolation, extrapolation and filtering introduce errors when performed over time intervals over which the channel is varying, i.e. over time periods larger than the coherence time of the channel. For example, in baseband after down conversion with a frequency $F_d$, the channel variations manifest themselves as a time varying phase $e^{i \cdot 2\pi \cdot (f_i - F_d) \cdot t} = e^{i \cdot 2\pi \cdot ((\Delta f)_i + F_c - F_d) \cdot t}$ of the channel components corresponding to the different multipath radio rays i.

Figure 4A:
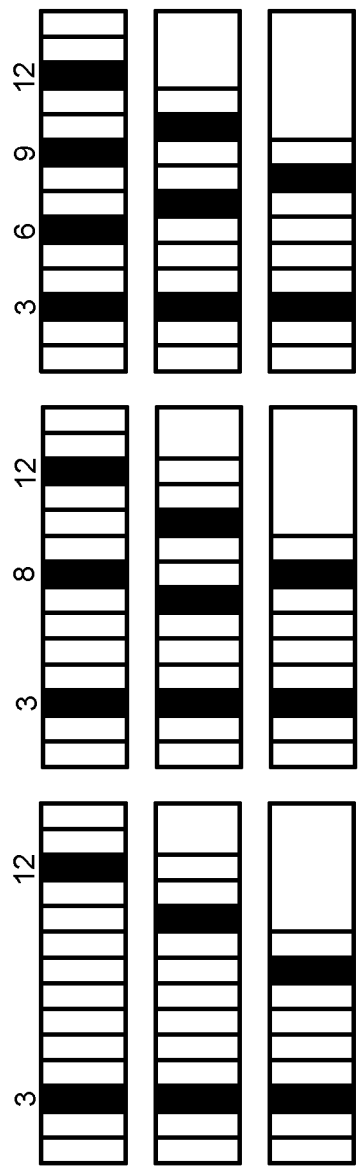
FIG. 4A is a block diagram of New Radio Physical Downlink Shared Channel (PDSCH) DMRS patterns according to some embodiments.
Figure 4B:
FIG. 4B is a block diagram of New Radio Physical Uplink Shared Channel (PUSCH) DMRS patterns according to some embodiments.
Figure 5:
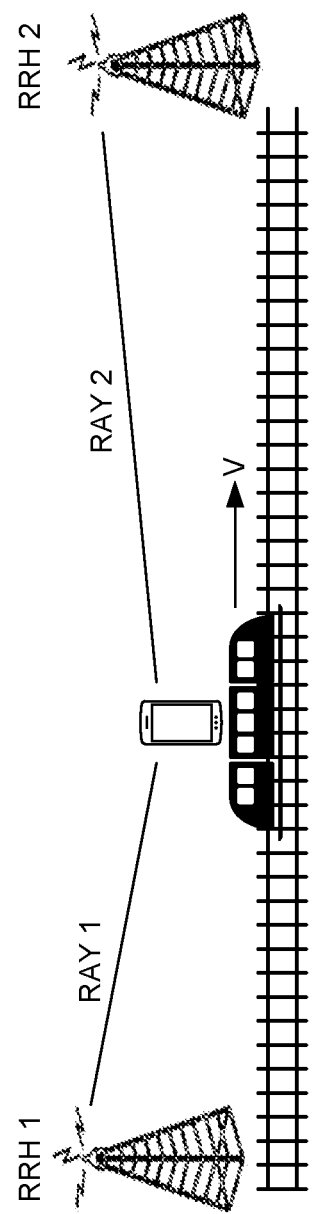
FIG. 5 is a block diagram of a high speed train scenario according to some embodiments.

In New Radio (NR), higher speeds can to some extent be accommodated for by configuring demodulation reference signal (DMRS) patterns with higher time density. FIG. 4A shows NR downlink examples of configurable NR Physical Downlink Shared Channel (PDSCH) DMRS patterns, where the symbols (in the NR 14 symbol slot) carrying PDSCH DMRS are darkly shaded. FIG. 4B shows NR uplink examples of configurable NR Physical Uplink Shared Channel (PUSCH) DMRS patterns, where the symbols (in the NR 14 symbol slot) carrying PUSCH DMRS are darkly shaded. This does, however, come at the cost of increased DMRS overhead. Also, for very high speeds (e.g. for the high speed train scenario in FIG. 5) performance is severely impacted by channel estimation errors resulting from channel estimation filtering, interpolation, and extrapolation, even for the DMRS patterns with high DMRS density in time.

Some embodiments utilize the difference in signal delays TC of different multipath radio rays to separate the channel estimate into different components corresponding to the different rays. Some embodiments then compensate for the time varying phase to remove the time variation of the channel components, perform channel estimate interpolation, extrapolation and/or filtering separately on each separated channel component, and then re-insert the time varying phase of each component. Finally, some embodiments add the channel estimate components together again to give the full channel estimate.

These and other embodiments may remove or reduce the time dependence of the channel estimate tap components by making a time dependent phase rotation using the estimated doppler shift of the corresponding tap. Alternatively or additionally, these and other embodiments perform channel estimate filtering, interpolation, and/or extrapolation separately for each channel estimate tap component.

Keeping the reference signal pattern fixed (e.g. for NR DMRS), some embodiments provide improved channel estimates and thus also improved throughput. Alternatively or additionally, some embodiments allow for a less dense reference signal pattern (e.g. for NR DMRS) without loss in channel estimation accuracy. This gives a reduction in reference signal overhead and thus gives an improvement in throughput.

Consider now one specific embodiment based on an orthogonal frequency division multiplexing (OFDM) system where the reference signal 12 (here referred to as DMRS, DeModulation Reference Signal) has a comb structure in frequency (every n'th subcarrier is used for the reference signal, where n is a positive integer). In NR, the reference signal (DMRS) may be the NR PDSCH DMRS in the downlink or the NR PUSCH DMRS in the uplink. In Long Term Evolution (LTE), the reference signal may be the LTE DMRS in the uplink, or the LTE DMRS in the downlink. Although referred to as DMRS below, this specific embodiment may alternatively use a reference signal 12 that is an LTE Cell-specific Reference Signal (CRS). The radio channel is assumed to have well separated channel taps as can be expected e.g. in the train scenario in FIG. 5.

Figure 6:
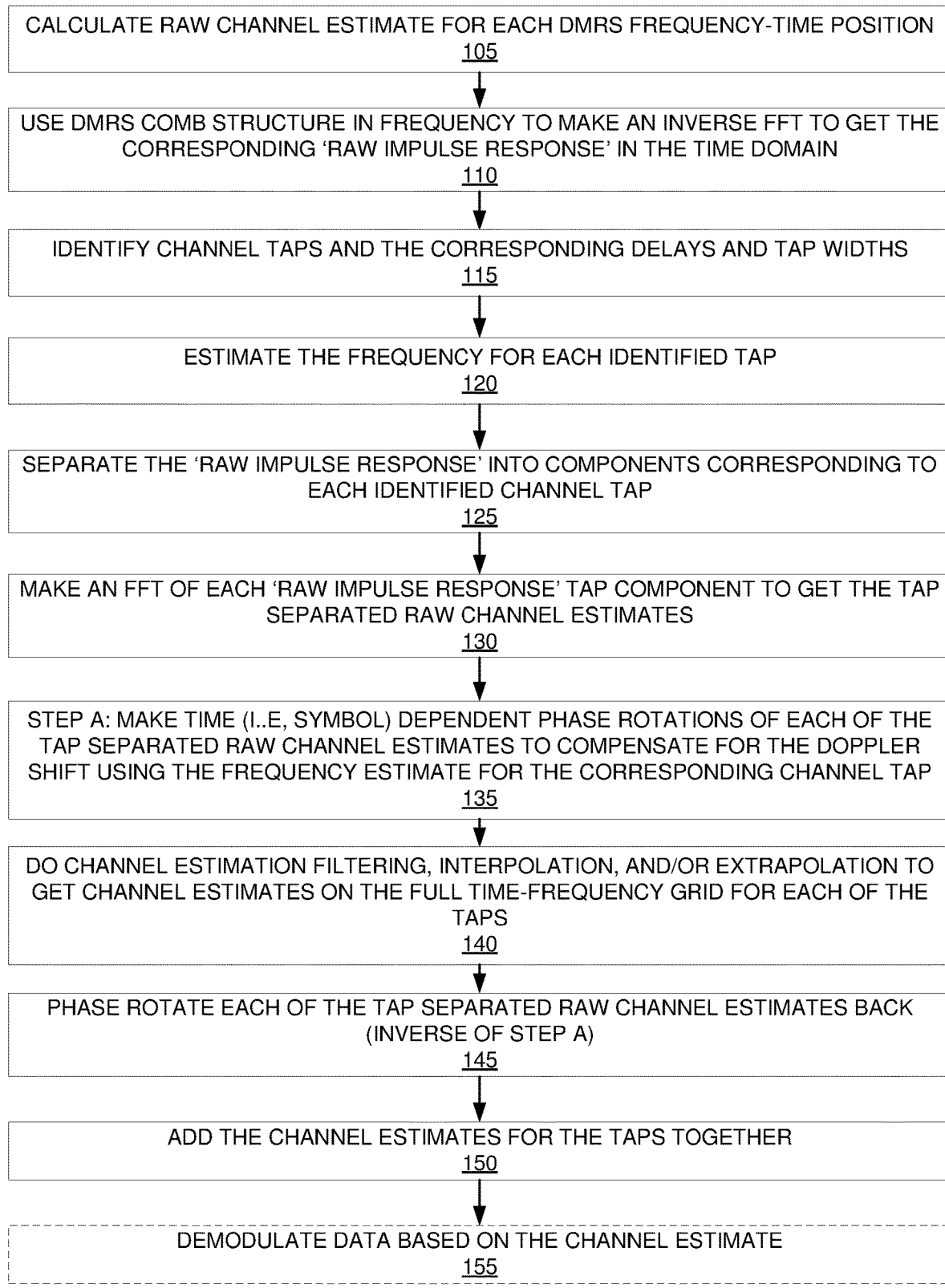
FIG. 6 is a logic flow diagram of a method performed by radio equipment for tap separated channel estimation according to some embodiments.

FIG. 6 shows a method performed by the radio equipment 10 for tap separated channel estimation according to this specific embodiment. The method steps in FIG. 6 are not necessarily shown in the order in which the radio equipment 10 performs them. Nonetheless, as shown, the radio equipment 10 (e.g., via the channel estimator 14) calculates raw channel estimates $X_l[n]$, n=0 ... N−1 for each DMRS frequency-time position indicated by index n (frequency, i.e. subcarrier) and l (time, i.e. symbol (Block 105). The raw channel estimates $X_l[n]$ may collectively correspond to the channel estimate 16 in FIG. 1, in embodiments wherein the channel estimate 16 is a raw channel estimate. Note that n and l only index subcarriers and symbols that carry DMRS. The radio equipment 10 may for instance perform a Discrete Fourier Transform (DFT) and divide the received subcarrier symbols by the corresponding known transmitted subcarrier symbols or perform matched filtering to the known subcarrier reference symbols.

The radio equipment 10 (e.g., via impulse response obtainer 50) then uses the DMRS comb structure in frequency and makes an inverse DFT to get the corresponding 'raw impulse response' $Y_l[k]=ifft(X_l[n])$ in the time domain (Block 110). The raw impulse response $Y_l[k]$ may correspond to the impulse response 52 in FIG. 2A.

The radio equipment 10 (e.g., via channel tap detector 24) also identifies channel taps and the corresponding delays and tap widths (Block 115). The radio equipment 10 may for instance identify the start sample $A_i$ and end sample $B_i$ for each identified tap i so that tap i is captured in the samples $Y_l[k]$ with $A^i \leq k \leq B^i$. The channel taps i may correspond to channel taps 22 in FIG. 1.

The radio equipment 10 (e.g., via channel tap detector 24) further estimates the frequency for each identified tap (Block 120). The frequencies may correspond to the frequencies 28 in FIG. 1. The radio equipment 10 may for instance use multiple reference signal symbols separated in time. As one example based on the estimation of the autocorrelation of the equivalent baseband channel, the radio equipment 10 may estimate the frequencies as follows. Let $P_m(n)$, m=1 .. . M, n=1, 2 be the l-indices of M DMRS symbol pairs to use for the estimation of the autocorrelation over a time interval $\Delta t = t_{P_m(2)} - t_{P_m(1)}$ where $t_i$ is the time of the end of the CP of DMRS symbol i. It is assumed that all symbol pairs are separated by the same distance in time. The radio equipment 10 calculate an estimate of the autocorrelation as:

$$\phi(\Delta t) = \sum_{m=1}^{M} \sum_{k=A_i}^{B_i} Y_{P_m(2)}[k] \cdot Y^*_{P_m(1)}[k],$$

where $A_i$ and $B_i$ are sample indices for the start and end of tap i. The radio equipment 10 then estimates the frequency of channel tap i relative to the frequency $F_d$ used for the down conversion to baseband as $$f_i^{est} - F_d = \frac{\arg(\phi(\Delta t))}{-i \cdot 2\pi \cdot \Delta t}.$$

The radio equipment 10 (e.g., via impulse response separator 54) furthermore separates the identified channel taps into separate impulse responses (Block 125), e.g., which may correspond to the impulse responses 56 in FIG. 2A. The radio equipment 10 may for instance put the impulse response samples to zero outside the identified tap: $Z_l^i[k]=Y_l[k] \cdot G^i[k]$, where $$G^i[k] = \begin{cases} 1 & \text{for } A^i \leq k \leq B^i \\ 0 & \text{for not}(A^i \leq k \leq B^i) \end{cases}.$$

The radio equipment 10 (e.g., via frequency transformer 58) then FFTs the impulse responses back to the frequency domain to get tap separated raw channel estimates: $P_l^i[n]=fft(Z_l^i[k])$ (Block 130). The tap separated channel estimates $P_l^i[n]$ may correspond to the channel estimate components 20 in FIGS. 1 and 2A.

The radio equipment 10 (e.g., via tap-separated component compensator 26) next makes time (i.e. symbol) dependent phase rotation of each of the tap separated raw channel estimates to compensate for the doppler shifts using the frequency estimate $f_i^{est}$ for the corresponding channel tap (Block 135). The radio equipment 10 may for instance multiply the tap separated raw channel estimates of symbol n with $e^{-i \cdot 2\pi \cdot (f_i^{est}-F_d) \cdot t_n}$ where $t_n$ is the time of the end of the Cyclic Prefix (CP) of DMRS symbol n, i.e., $Q_l^i[n]= P_l^i[n] \cdot e^{-i \cdot 2\pi \cdot (f_i^{est}-F_d) \cdot t_n}$. The rotated tap separated channel estimates $Q_l^i[n]$ may for instance correspond to the compensated channel estimate components 32 in FIG. 1.

The radio equipment 10 (e.g., via tap-separated component processor 30) performs channel estimation filtering, interpolation and/or extrapolation to get channel estimates $R_L^i[N]$ on the full time-frequency grid for each of the taps (Block 140). These channel estimates $R_L^i[N]$ may correspond to the processed channel estimate components 34 in FIG. 1. Note that N and L run over all subcarriers and symbols and not only over those carrying DMRS. Due to the doppler shift dependent phase rotation, filtering, interpolation and extrapolation should work fine, with reduced errors.

As part of the channel estimation, channel analyses may be performed based on the separated channel component $Q_l^i[n]$ in order to estimate e.g. remaining doppler spread, delay spread, SNR etc. The channel analyses can then be used to make tap specific filtering, e.g. to perform more filtering over time based on the fact that the doppler spread of a separate tap component has been reduced relative to the complete channel.

The radio equipment 10 (e.g., via tap-separated component de-compensator 36) phase rotates back the processed channel estimate components (inverse of the original phase rotation) (Block 145). The radio equipment 10 may for example multiply the tap separated channel estimates of symbol n with $e^{+i \cdot 2\pi \cdot (f_i^{est}-F_d) \cdot T_N}$ where $T_N$ is the time of the end of the Cyclic Prefix (CP) of symbol N, i.e., $S_L^i[N]= R_L^i[N] \cdot e^{-i \cdot 2\pi \cdot (f_i^{est}-F_d) \cdot T_N}$. The de-rotated channel estimate components $S_L^i[N]$ may correspond to the de-compensated channel estimate components 38 in FIG. 1.

The radio equipment 10 (e.g., via tap-specific component combiner 40) adds the channel estimate tap components together (Block 150) to get the final channel estimate $C_L[N]$, i.e., $C_L[N]=\Sigma_i S_L^i[N]$. The final channel estimate $C_L[N]$ may correspond to the combined channel estimate 42 in FIG. 1.

The radio equipment 10 may then demodulate data based on the channel estimate (Block 155) in some embodiments.

As described above, in rich scattering environments, there will be a multitude of rays that may be partly overlapping in the time domain, making it difficult or impossible to separate them uniquely in step 115 of FIG. 6. Some embodiments then modify step 115 to divide the time axis of the raw impulse response into segments (e.g. of equal length) and treat the raw impulse response component corresponding to each segment as a separate tap. Alternatively or additionally, many of the taps will typically only contain noise. In order to reduce computational load, the radio equipment 10 can remove such taps e.g. by modifying step 115 as follows. The radio equipment 10 may use the Akaike criterium to identify a continuous time interval outside which the raw channel estimate should be modelled as only noise (i.e. zero channel). The radio equipment 10 may then divide the time interval identified into segments (e.g. of equal length) and treat the raw impulse response component corresponding to each segment as a separate tap.

Figure 7:
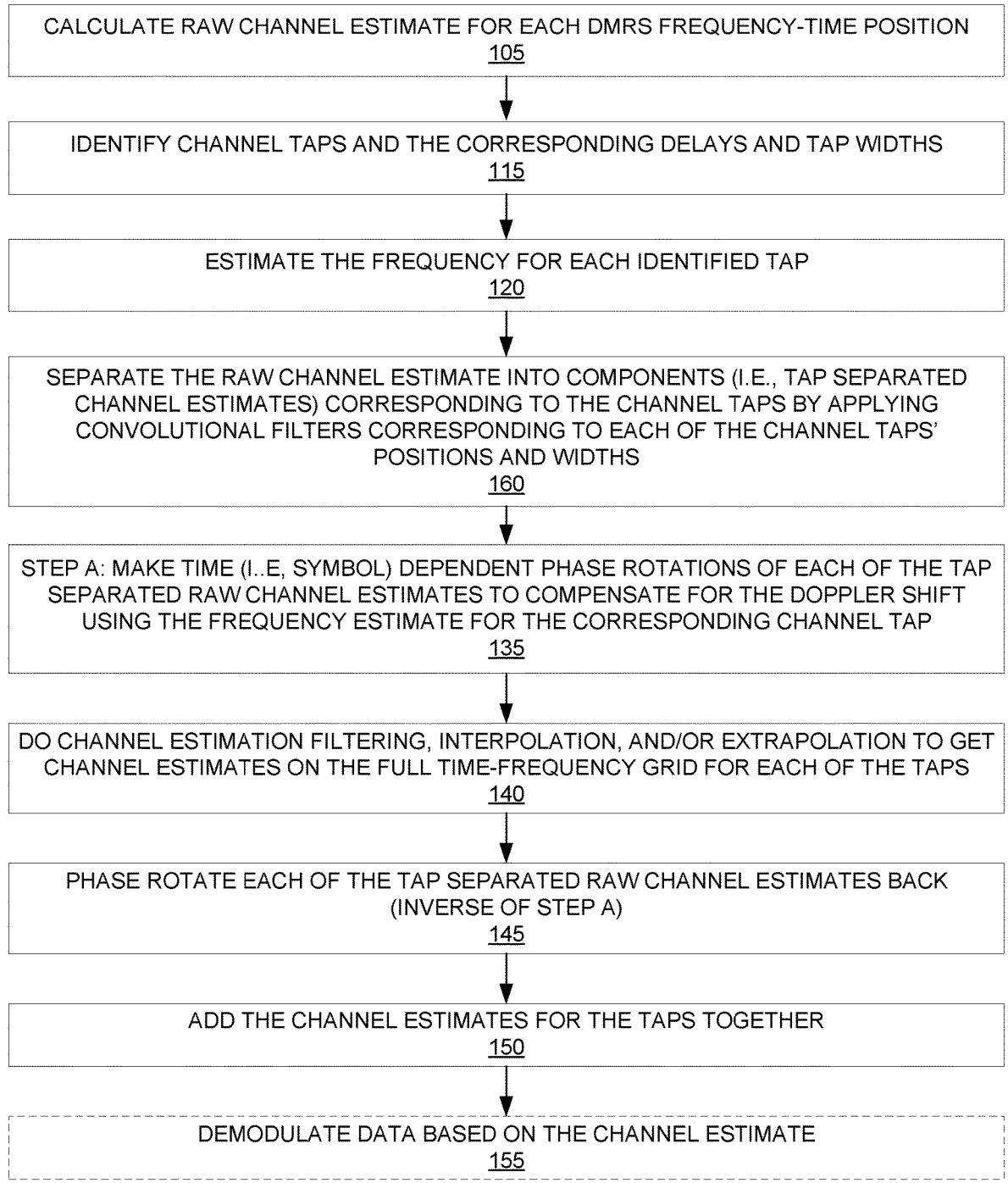
FIG. 7 is a logic flow diagram of a method performed by radio equipment for tap separated channel estimation according to some embodiments in which channel tap separation is performed in the frequency domain.

Instead of separating the channel taps in the time domain, the radio equipment 10 in some embodiments performs that by deploying a convolutional filter for each tap in the frequency domain that has the same effect as in the time domain. The existence of such a filter follows from the convolution theorem for the discrete fourier transform and the exact form of the filter is calculated based on the position and width of the channel tap (as identified in step 115 of FIG. 6). FIG. 7 shows such an embodiment where steps 110, 125, and 130 are replaced by a step 160. In this step, the radio equipment 10 separates the raw impulse response into components corresponding to the identified channel taps by applying the convolutional filters corresponding to each of the identified channel taps positions and widths, i.e., $P_l^i[n]=\Sigma_{m=0}^{N-1}X_l[m]\cdot H^i[n-m]$, where $H^i[n]=\text{fft}(G^i[k])$, $H^i[n]$ is periodically extended so that $H^i[n+N]=H^i[n]$ and $$G^i[k] = \begin{cases} 1 & \text{for } A^i \le k \le B^i \\ 0 & \text{for not}(A^i \le k \le B^i) \end{cases}.$$

Accordingly, $$H^i[n] = \frac{1}{N}\cdot\sum_{k=A^i}^{B^i} e^{-2\pi j\cdot\frac{k\cdot n}{N}} = \begin{cases} \frac{1}{N}\cdot\dfrac{e^{-2\pi j\cdot\frac{(B^i+1)\cdot n}{N}} - e^{-2\pi j\cdot\frac{A^i\cdot n}{N}}}{e^{-2\pi j\cdot\frac{n}{N}}-1} & \text{for } 0 < n < N \\ \dfrac{B^i + 1 - A^i}{N} & \text{for } n = 0 \end{cases}.$$

Note though that the exact form of the tap separation filter ($H^i[n]$ in the frequency domain or $G^i[k]$ in the time domain) could be modified e.g. to take into account the power profile of the tap.

Figure 8:
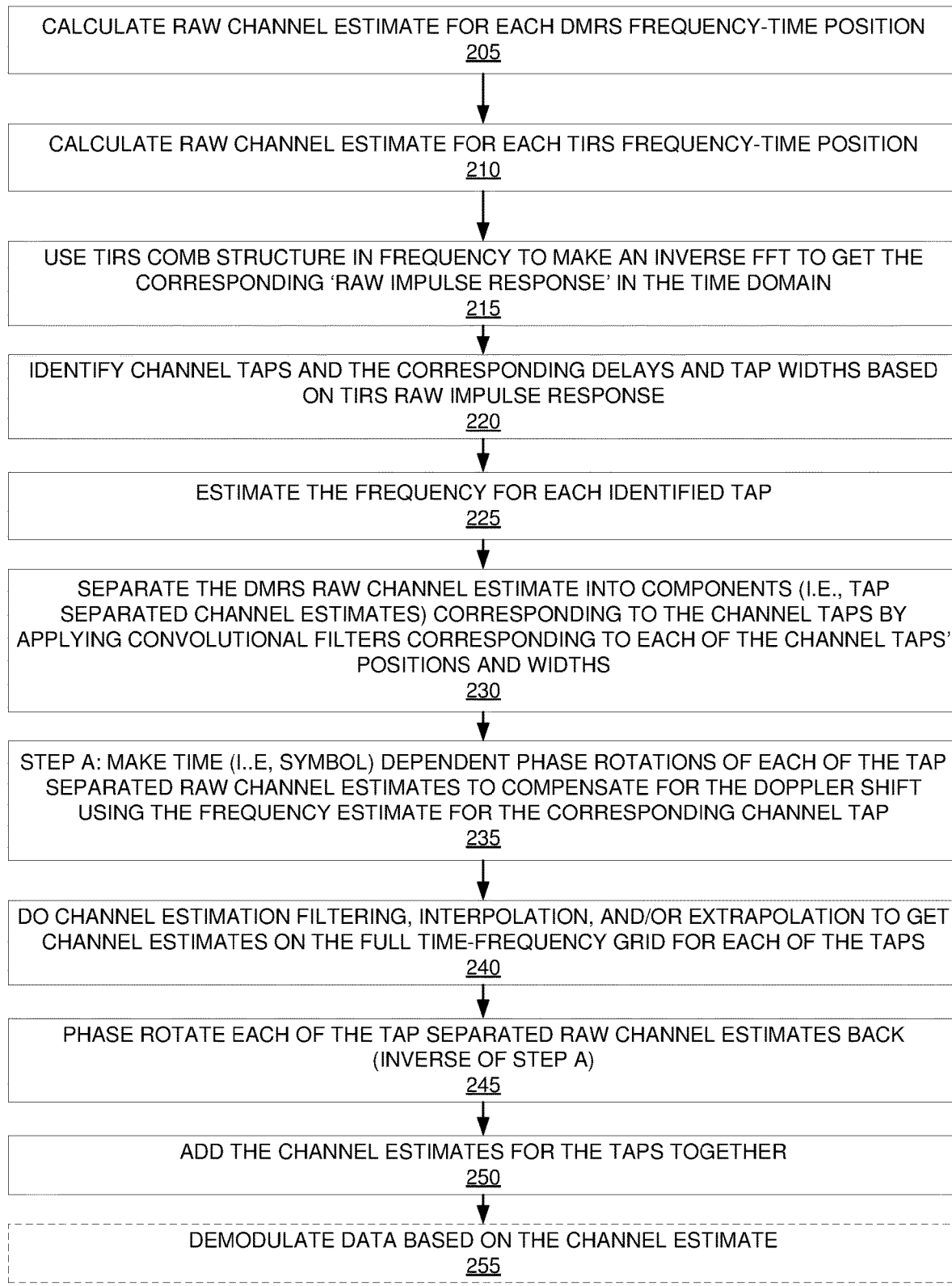
FIG. 8 is a logic flow diagram of a method performed by radio equipment for tap separated channel estimation according to some embodiments in which different reference signals are used for the identification of the channel taps and for the actual channel estimation.

Still other embodiments herein use different reference signals for the identification of the channel taps and for the actual channel estimation. The different reference signal (e.g., reference signal 12' in FIG. 1) used for the tap identification may be referred to as a Tap Identification Reference Signal (TIRS). As an example, in the NR downlink TIRS could be the CSI RS for tracking (also referred to as the TRS), while DMRS could simply be the NR PDSCH DMRS. In the LTE downlink TIRS could be the CRS while DMRS could be the LTE DMRS. Regardless, FIG. 8 shows an example according to these embodiments.

As shown, the radio equipment 10 (e.g., via the channel estimator 14) calculates raw channel estimates $X_l[n]$, $n=0 \ldots N-1$ for each DMRS frequency-time position indicated by index n (frequency, i.e. subcarrier) and l (time, i.e. symbol (Block 205), in the same way as described with respect to Block 105 in FIGS. 6 and 7.

The radio equipment 10 also calculate raw channel estimates $W_l[n]$, $n=0 \ldots N_W-1$ for each TIRS frequency-time position indicated by index n (frequency, i.e. subcarrier) and l (time, i.e. symbol) (Block 210). Here, note that n and l only index subcarriers and symbols that carry TIRS.

The radio equipment 10 then uses the TIRS comb structure in frequency and makes an inverse DFT to get the corresponding 'raw impulse response' $Y_l[k]=\text{ifft}(W_l[n])$ in the time domain (Block 215). The radio equipment next identifies channel taps and the corresponding delays and tap widths based on the TIRS raw impulse response (Block 220). The radio equipment 10 for instance identifies the start sample $A_i$ and end sample $B_i$ for each identified tap i so that tap i is captured in the samples $Y_l[k]$ with $A^i \le k \le B^i$.

The radio equipment 10 also estimates the frequency for each identified tap (Block 225), e.g., as described above with respect to FIGS. 6 and 7.

The radio equipment 10 further separates the DMRS raw channel estimate X into components corresponding to the identified channel taps by applying the convolutional filters corresponding to each of the identified channel taps positions and widths (as identified from the TIRS) (Block 230). In particular, the radio equipment 10 calculates the channel estimate components as $P_l^i[n]=\Sigma_{m=0}^{N-1}X_l[m]\cdot H^i[n-m]$, where $H^i[n]=\text{fft}(G^i[k])$, $H^i[n]$ is periodically extended so that $$H^i[n + N] = H^i[n], \text{ and}$$

$$G^i[k] = \begin{cases} 1 & \text{for } A^i \le k \le B^i \\ 0 & \text{for not}(A^i \le k \le B^i) \end{cases}.$$

That is, $$H^i[n] = \frac{1}{N}\cdot\sum_{k=A^i}^{B^i} e^{-2\pi j\cdot\frac{k\cdot n}{N}} = \begin{cases} \frac{1}{N}\cdot\dfrac{e^{-2\pi j\cdot\frac{(B^i+1)\cdot n}{N}} - e^{-2\pi j\cdot\frac{A^i\cdot n}{N}}}{e^{-2\pi j\cdot\frac{n}{N}}-1} & \text{for } 0 < n < N \\ \dfrac{B^i + 1 - A^i}{N} & \text{for } n = 0 \end{cases}.$$

Processing in this embodiment then proceeds similarly as in FIGS. 6 and 7.

Note that rays with different angle of arrival can of course accidentally have the same signal delay. In such cases, the rays cannot be separated based on the delay and clearly if all rays would have the same delay some embodiments would not produce any gain.

Note also that, in real life, the rays are typically not discrete components as in the analytical description above but have a spread in frequency and delay. As long as the spread in frequency is small, embodiments herein will still work since the doppler spread of each tap will be small and thus the coherence time of each tap will be long.

Regardless, keeping the reference signal pattern fixed (e.g. for NR DMRS), some embodiments provide improved channel estimates and thus also improved throughput. Alternatively, some embodiments allow for a less dense reference signal pattern (e.g. for NR DMRS) without loss in channel estimation accuracy. This gives a reduction in reference signal overhead and thus gives an improvement in throughput.

Figure 9:
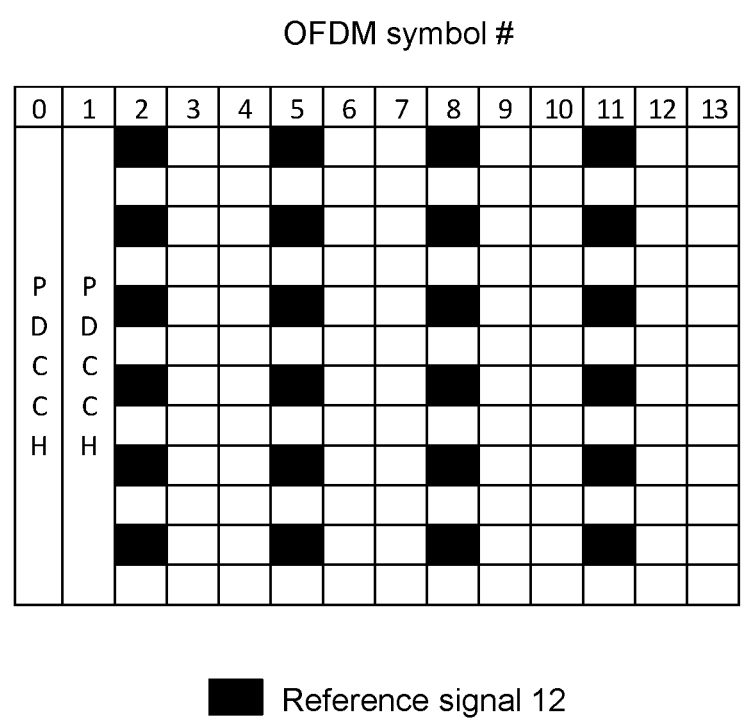
FIG. 9 is a block diagram of a DMRS pattern intended for high speeds in NR according to some embodiments.

Consider for instance simulated downlink throughput using tap separated channel estimation in a high-speed train scenario, as compared to normal channel estimation. The scenario is based on SFN transmission from RRH's (remote radio heads) located 50 m from a railway track. The distance between RRH's along the railway track is 1000 m. The train and terminal velocity is 500 km/h. The channel consists of a line of sight tap from each of the four RRH's that are closest to the terminal. The tap powers are inversely proportional to the distance squared between RRH and terminal. The NR technology is used with a DMRS pattern intended for high speeds, as shown in FIG. 9. The carrier frequency is 3.5 GHz, the bandwidth is 36 MHz and the subcarrier spacing is 30 kHz.

Figure 10:
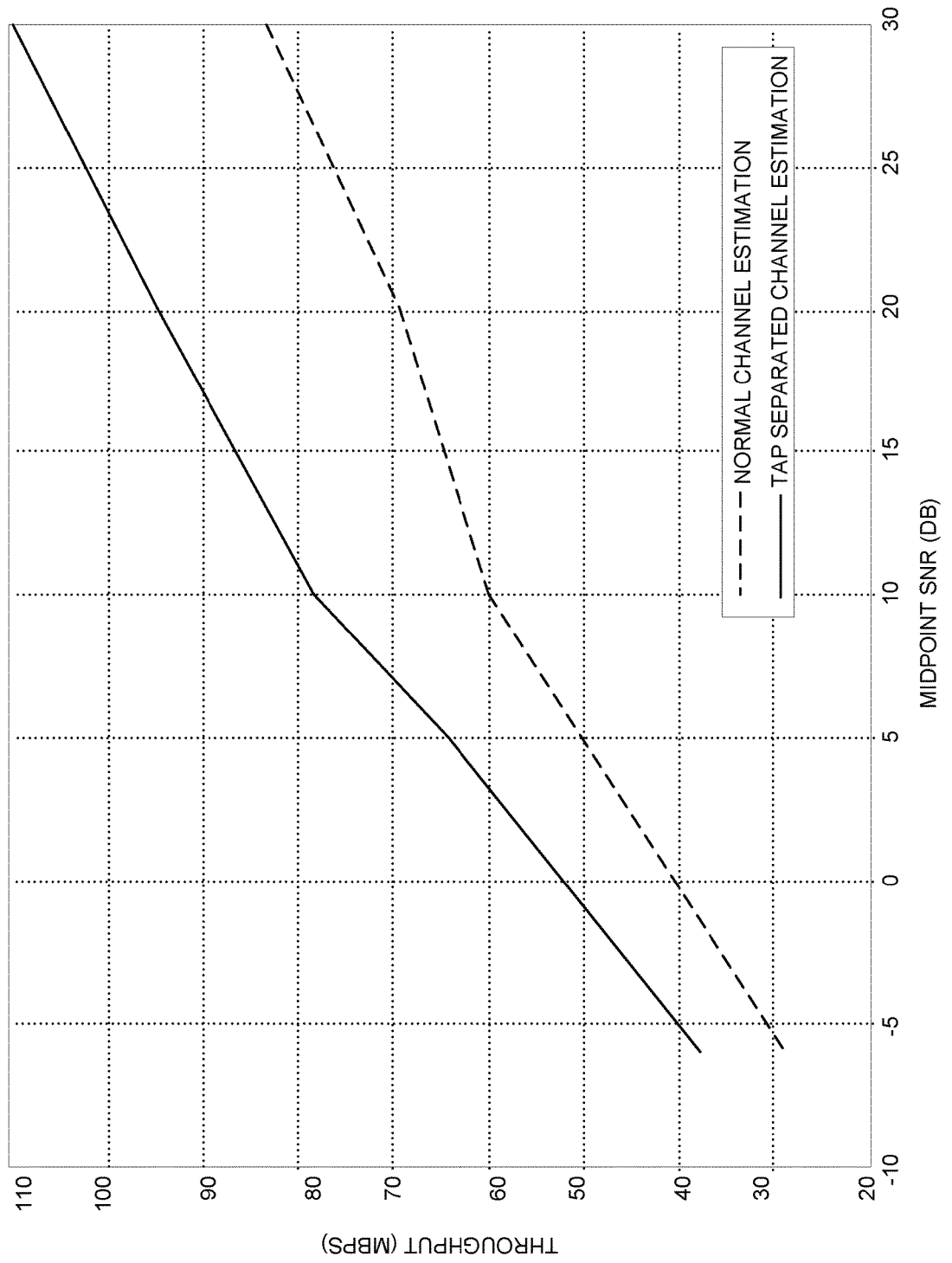
FIG. 10 is a graph of average throughput overtime for a high speed train scenario using different channel estimation approaches according to some embodiments.

FIG. 10 shows average throughput overtime for high speed train scenario. Midpoint SNR refers to the SNR when the UE is in the middle between two RRH's. The noise is assumed to be independent of terminal position and thus the SNR at other positions follow from the distance dependence of the RRH signal powers (1/distance^2).

Figure 11:
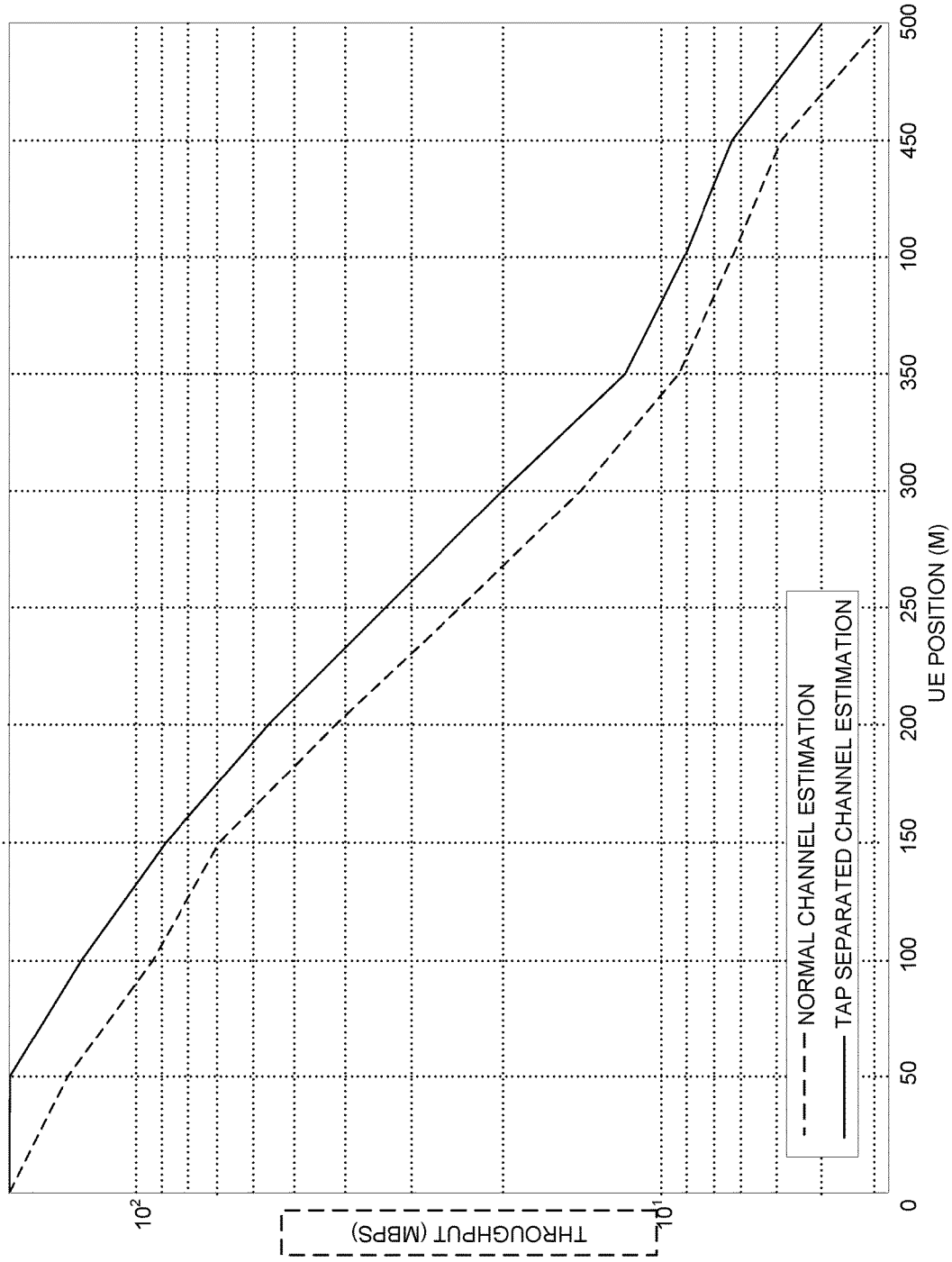
FIG. 11 is a graph of average throughput over time for a high speed train scenario using different channel estimation approaches according to other embodiments.

FIG. 11 shows throughput in the high speed train scenario depending on the distance of the UE from the closest RRH. The SNR when the UE is in the middle between two RRH's is 5 dB. The noise is assumed to be independent of terminal position and thus the SNR at other positions follow from the distance dependence of the RRH signal powers (1/distance^2).

Figure 12:
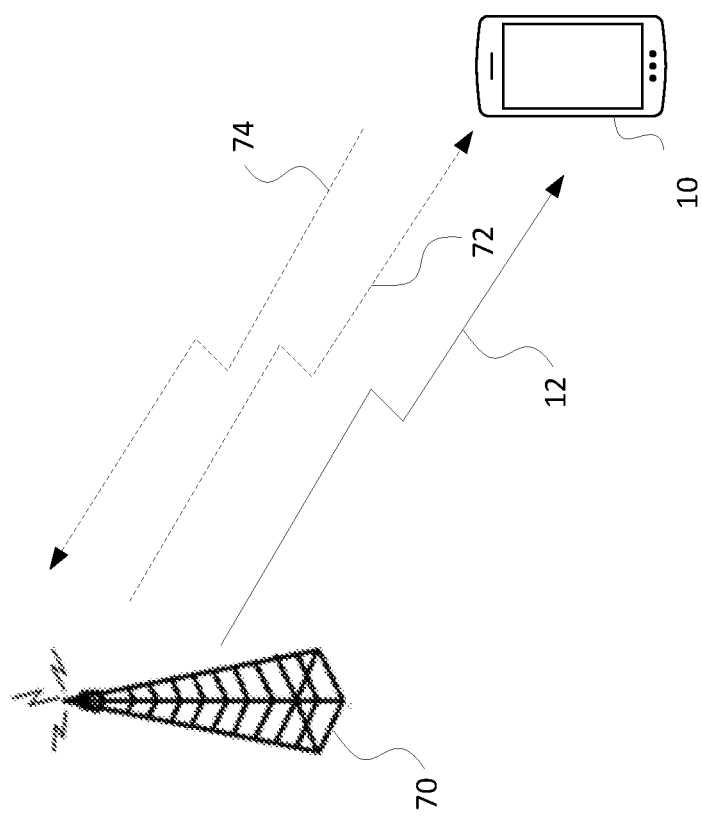
FIG. 12 is a block diagram of a wireless device that performs tap separated channel estimation and a radio network equipment that assists with such estimation according to some embodiments.

FIG. 12 shows some embodiments herein where the radio equipment 10 configured to perform tap separated channel estimation as described above is a wireless device (e.g., a user equipment). In this case, radio network equipment 70 (e.g., a base station) may be configured to assist with such tap separated channel estimation or control when or under what circumstances the radio equipment 10 performs tap separated channel estimation. The radio network equipment 70 in some embodiments transmits control signalling 72 to the radio equipment 10 that carries out this assistance or control. Alternatively or additionally, the radio equipment 10 may transmit signalling 74 to the radio network equipment to inform the radio network equipment that such assistance or control is possible (e.g., that the radio equipment 10 is capable of tap separated channel estimation).

More particularly, according to some embodiments, the radio equipment 10 transmits signalling 74 indicating its capability to perform tap separated channel estimation to the radio network equipment 70. Based on information such as, e.g., radio equipment mobility and velocity information, information on the network deployment (e.g., that the base station/cell covers a railway or highway), the capability to perform tap separated channel estimation, or the like, the radio network equipment 70 transmits signalling 72 to the radio equipment 10 that it should utilize tap separated channel estimation. Alternatively or additionally, the signalling 72 may configure the radio equipment 10 for a reference signal pattern (e.g., DMRS pattern) based on the radio equipment's capability to perform tap separated channel estimation, e.g., combined with other information such as on radio equipment mobility.

According to other embodiments, the radio equipment 10 transmits signalling 74 indicating its capability to perform tap separated channel estimation. The capability may not necessarily refer directly to tap separated channel estimation. Instead, the capability can be tied to requirements on demodulation at high speeds, where the requirement level has been set based on the use of tap separated channel estimation. Or, the capability can be tied to a certain reference signal pattern. Regardless, the radio network equipment 70 configures a reference signal pattern (e.g. a PDSCH DMRS pattern) based on the knowledge of the radio equipment's capability combined with other information such as information on the radio equipment's mobility and velocity. The knowledge of the capability to perform tap separated channel allows radio network node 70 to configure a reference signal pattern with lower density estimation in time, thus reducing the reference signal overhead. In any event, the radio equipment 10 in this case may receive the data signal (e.g., PDSCH) utilizing tap separated channel estimation.

According to still other embodiments that may be implemented separately or in combination with the above, the radio network equipment 70 may configure or otherwise control when the radio equipment 10 performs tap separated channel estimation, e.g., so that the radio equipment 10 is not constantly utilizing such channel estimation and thereby saving computational load. In this case, based on information such as radio equipment mobility and velocity information, information on the network deployment (e.g. base station/cell covers railway or highway), etc, the radio network equipment 70 transmits signalling 74 to the radio equipment 10 that it should utilize tap separated channel estimation. This signalling may be broadcast to all terminals or sent through dedicated signalling to one individual terminal. Terminal-specific information such as terminal individual information on mobility and velocity may be utilized in the radio network node's decision in the case of dedicated signalling. In any event, the radio network equipment 70 correspondingly configures a reference signal pattern (E.g., a PDSCH DMRS pattern) suitable for reception utilizing tap separated channel estimation. The radio equipment 10 then receives the data signal (e.g., PDSCH) utilizing tap separated channel estimation.

Figure 13:
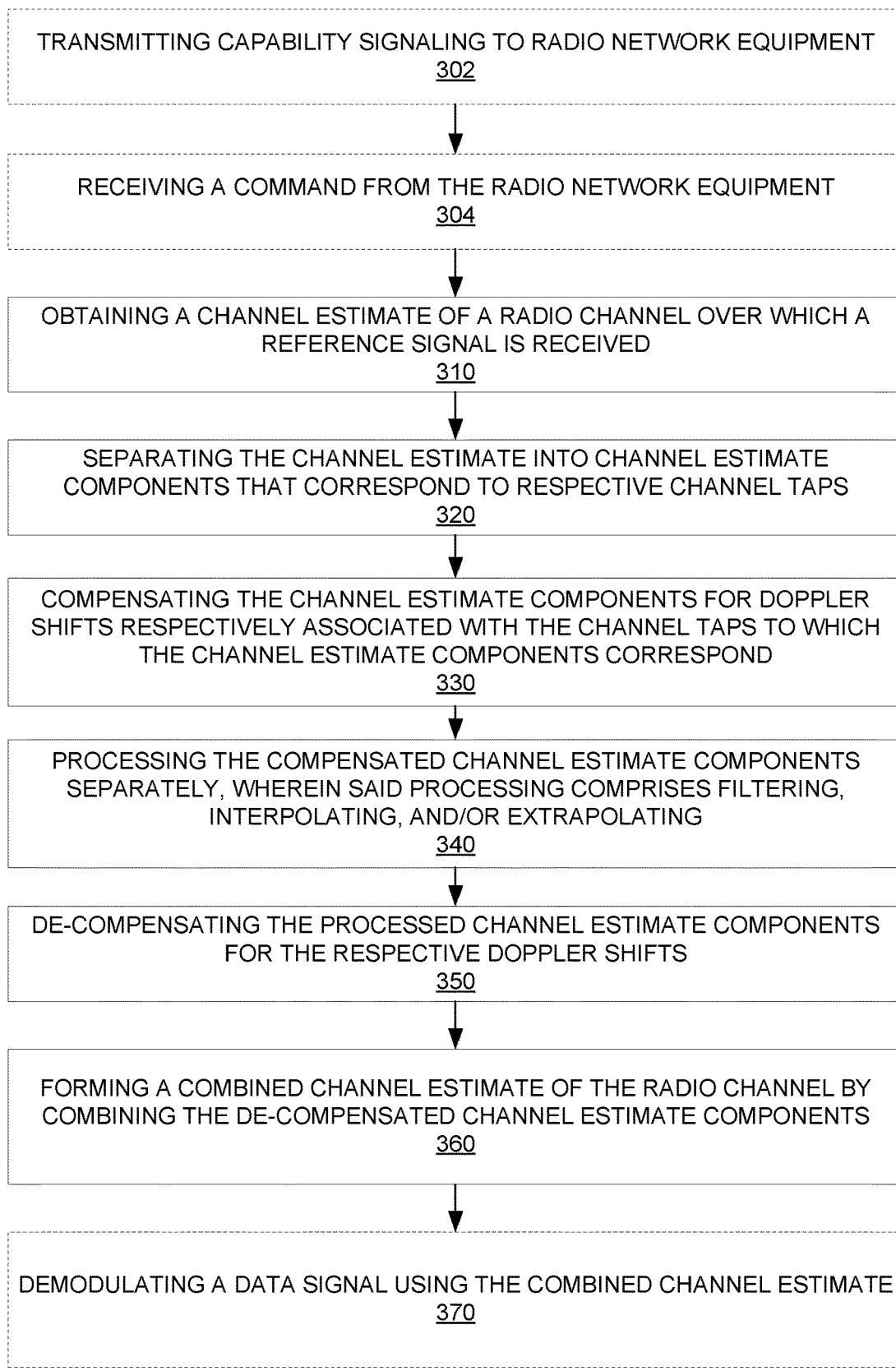
FIG. 13 is a logic flow diagram of a method performed by radio equipment for tap separated channel estimation in a wireless communication system in accordance with some embodiments.

In view of the above modifications and variations, FIG. 13 depicts a method performed by radio equipment 10 (e.g., a user equipment or radio network equipment) for tap separated channel estimation in a wireless communication system in accordance with particular embodiments. The method includes obtaining a channel estimate 16 of a radio channel over which a reference signal 12 is received (Block 310). The method also includes separating the channel estimate 16 into channel estimate components 20 that correspond to respective channel taps 22 (Block 320). The method further includes compensating the channel estimate components 20 for Doppler shifts respectively associated with the channel taps 22 to which the channel estimate components 20 correspond (Block 330). The method also includes processing the compensated channel estimate components 32 separately, wherein said processing comprises filtering, interpolating, and/or extrapolating (Block 340). The method further includes de-compensating the processed channel estimate components 34 for the respective Doppler shifts (Block 350). The method then includes forming a combined channel estimate 42 of the radio channel by combining the de-compensated channel estimate components 38 (Block 360). In some embodiments, the method may further include demodulating a data signal 46 using the combined channel estimate 42 (Block 370).

In some embodiments, the method further comprises estimating respective frequencies for the channel taps. In this case, compensating the channel estimate components 20 may comprise performing time-dependent phase rotation of the channel estimate components 20 using the frequencies respectively estimated for the channel taps 22 to which the channel estimate components 20 correspond. For example, performing time-dependent phase rotation of the channel estimate components 20 may comprise multiplying each channel estimate component 20 for symbol n by a respective phase $e^{-i \cdot 2\pi \cdot (f_i^{est} - F_d) \cdot t_n}$, where $f_i^{est}$ is the frequency respectively estimated for the channel tap i to which the channel estimate component 20 corresponds and $F_d$ is a frequency with which the received signal is down-converted to baseband.

Alternatively or additionally, in some embodiments, separating the channel estimate 16 may comprise obtaining an impulse response from the channel estimate 16, separating the impulse response into tap-specific impulse responses that respectively correspond to the channel taps 22, and obtaining the channel estimate components that respectively correspond to channel taps 22 by transforming the tap-specific impulse responses into a frequency domain. In other embodiments, separating the channel estimate 16 may comprise applying tap separation filters, corresponding to the respective channel taps 22, to the channel estimate 16.

In any of the embodiments, the method may comprise identifying the channel taps 22 from an impulse response calculated based on the reference signal 12, or a different reference signal 12', received over the radio channel. In one embodiment in which the channel taps are identified from an impulse response calculated based on the different reference signal 12', the different reference signal may be a tracking reference signal, a channel state information reference signal, a sounding reference signal, or a cell-specific reference signal. Regardless, identifying the channel taps 22 may comprise dividing a time interval of the impulse response into multiple time segments and treating one or more components of the impulse response corresponding to one or more of the time segments as one or more of the channel taps 22.

In any event, in some embodiments, at least one of the channel estimate components corresponds to multiple channel taps with Doppler shifts that differ from one another by an amount less than a threshold.

In some embodiments, the reference signal is a demodulation reference signal or a cell-specific reference signal.

The method in some embodiments includes transmitting capability signaling 74 to radio network equipment 70. The signaling 74 may for instance indicate that the radio equipment 10 is capable of tap separated channel estimation. Or the signaling 74 may indicate that the radio equipment 10 is capable of meeting a certain demodulation performance requirement while the radio equipment 10 is moving at a speed within a certain range, wherein the radio equipment 10 is configured to perform tap separated channel estimation while moving at a speed within the certain range. In still other embodiments, the signaling 74 may indicate that the radio equipment 10 is capable of performing channel estimation using a certain one of multiple possible reference signal patterns with different respective time domain reference symbol densities, wherein the radio equipment 10 is configured to perform tap separated channel estimation when the reference signal 12 received has the certain reference signal pattern.

Alternatively or additionally, the method may include receiving a command (e.g., via signaling 76) from radio network equipment 70. The command may for instance indicate that the radio equipment 10 is to perform tap separated channel estimation. Or, the command may indicate that the radio equipment 10 is to meet a certain demodulation performance requirement while the radio equipment is moving at a speed within a certain range, wherein the radio equipment is configured to perform tap separated channel estimation while moving at a speed within the certain range. In other embodiments, the command may indicate that the radio equipment 10 is to perform channel estimation using a certain one of multiple possible reference signal patterns with different respective time domain reference symbol densities, wherein the radio equipment is configured to perform tap separated channel estimation when the reference signal received has the certain reference signal pattern.

FIG. 14 depicts a method performed by a user equipment configured for use in a wireless communication system in accordance with other particular embodiments. The method includes transmitting to radio network equipment 70 signaling indicating whether or not the user equipment has a certain capability (Block 410). The certain capability may include tap separated channel estimation, e.g., as described above in which the user equipment compensates channel estimate components for Doppler shifts respectively associated with channel taps to which the channel estimate components correspond and filters, interpolates, and/or extrapolates the compensated channel estimate components separately. Or, the certain capability may include meeting a certain demodulation performance requirement while the user equipment is moving at a speed within a certain range, wherein the user equipment is configured to perform tap separated channel estimation while moving at a speed within the certain range. Or, the certain capability may include performing channel estimation using a certain one of multiple possible reference signal patterns with different respective time domain reference symbol densities, wherein the user equipment is configured to perform tap separated channel estimation when the reference signal received has the certain reference signal pattern. Regardless, in some embodiments, the method further includes performing tap separated channel estimation in accordance with the signaling (Block 420).

FIG. 15 depicts a method performed by a user equipment configured for use in a wireless communication system in accordance with other particular embodiments. The method includes receiving from radio network equipment 70 signaling indicating whether or not the user equipment is to perform tap separated channel estimation, meet a certain demodulation performance requirement, or perform channel estimation using a certain reference signal (Block 510). The tap separated channel estimation is, e.g., as described above in which the user equipment compensates channel estimate components for Doppler shifts respectively associated with channel taps to which the channel estimate components correspond and filters, interpolates, and/or extrapolates the compensated channel estimate components separately. The certain demodulation performance requirement may be a certain demodulation performance requirement while the user equipment is moving at a speed within a certain range, wherein the user equipment is configured to perform tap separated channel estimation while moving at a speed within the certain range. And the certain reference signal pattern may be one of multiple possible reference signal patterns with different respective time domain reference symbol densities, wherein the user equipment is configured to perform tap separated channel estimation when the reference signal received has the certain reference signal pattern. In some embodiments, the method further includes performing tap separated channel estimation in order to comply with the signaling from the radio network equipment 70 (Block 520).

Figure 16:
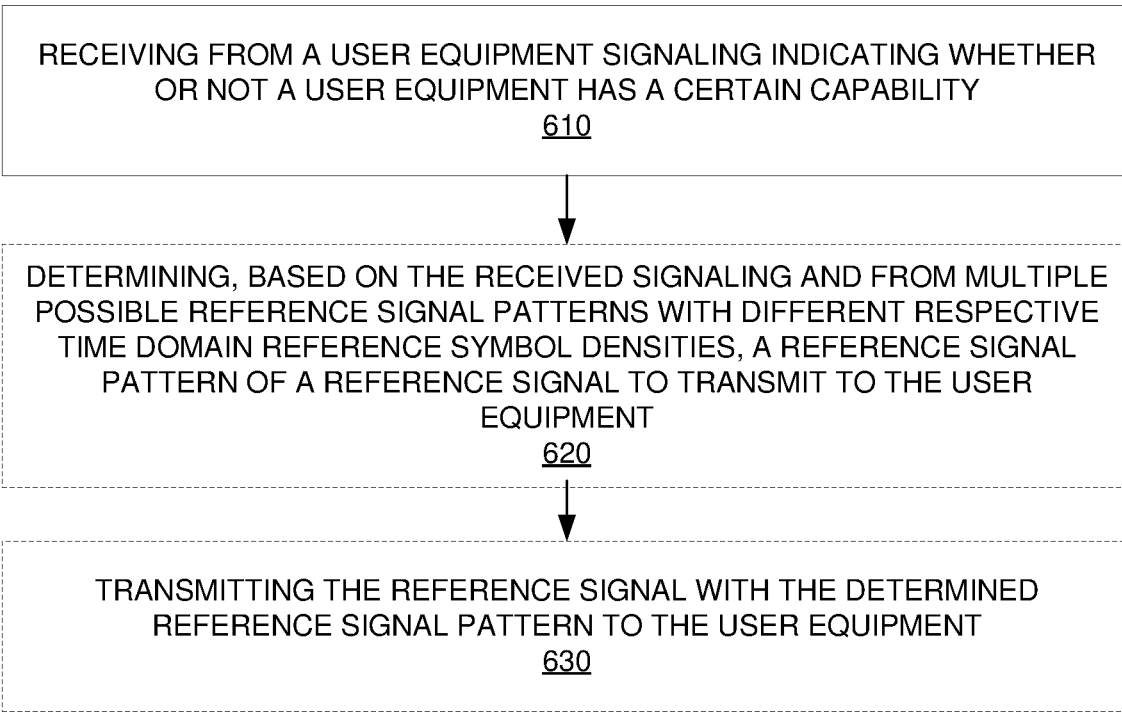
FIG. 16 is a logic flow diagram of a method performed by a radio network equipment configured for use in a wireless communication system in accordance with other particular embodiments.

FIG. 16 depicts a method performed by a radio network equipment configured for use in a wireless communication system in accordance with other particular embodiments. The method includes receiving from a user equipment signaling indicating whether or not a user equipment has a certain capability (Block 610). The certain capability may include tap separated channel estimation, e.g., as described above in which the user equipment compensates channel estimate components for Doppler shifts respectively associated with channel taps to which the channel estimate components correspond and filters, interpolates, and/or extrapolates the compensated channel estimate components separately. Or, the certain capability may include meeting a certain demodulation performance requirement while the user equipment is moving at a speed within a certain range. Or the certain capability may include performing channel estimation using a certain one of multiple possible reference signal patterns with different respective time domain reference symbol densities. Regardless, the method in some embodiments may further include determining, based on the received signaling and from multiple possible reference signal patterns with different respective time domain reference symbol densities, a reference signal pattern of a reference signal to transmit to the user equipment (Block 620). In one embodiment, for instance, such determination may comprise determining that the reference signal is to have a reference signal pattern with a relatively lower or higher time domain reference symbol density depending respectively on whether or not the signaling indicates the user equipment has the certain capability. Regardless, the method may also include transmitting the reference signal with the determined reference signal pattern to the user equipment (Block 630).

Figure 17:
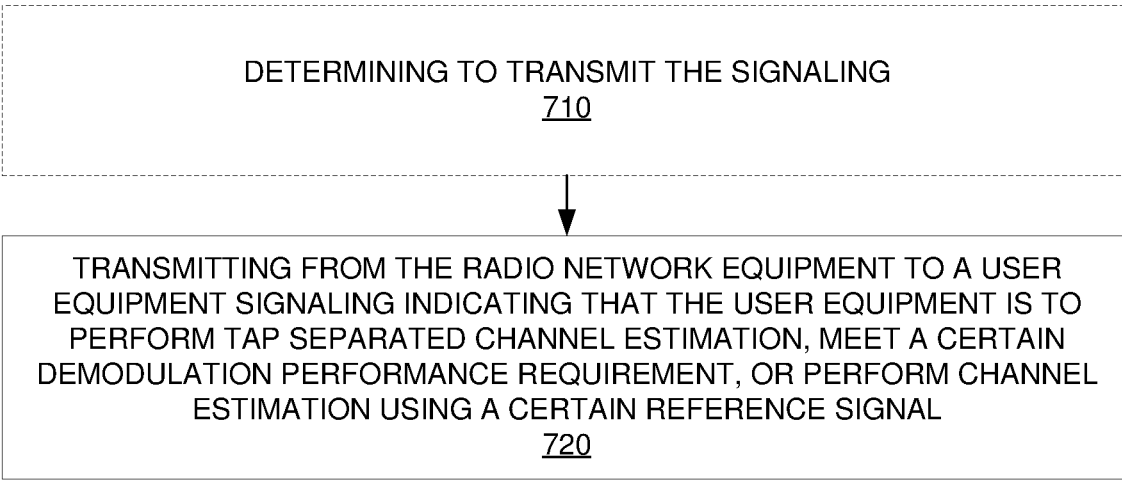
FIG. 17 is a logic flow diagram of a method performed by a radio network equipment configured for use in a wireless communication system in accordance with other particular embodiments.

FIG. 17 depicts a method performed by a radio network equipment configured for use in a wireless communication system in accordance with other particular embodiments. The method includes transmitting from the radio network equipment 70 to a user equipment signaling indicating that the user equipment is to perform tap separated channel estimation, meet a certain demodulation performance requirement, or perform channel estimation using a certain reference signal (Block 720). The tap separated channel estimation is, e.g., as described above in which the user equipment compensates channel estimate components for Doppler shifts respectively associated with channel taps to which the channel estimate components correspond and filters, interpolates, and/or extrapolates the compensated channel estimate components separately. The certain demodulation performance requirement may be a certain demodulation performance requirement that is capable of being met while the user equipment is moving at a speed within a certain range (e.g., by the user equipment performing tap separated channel estimation). And the certain reference signal pattern may be one of multiple possible reference signal patterns with different respective time domain reference symbol densities, wherein the user equipment is configured to perform tap separated channel estimation when the reference signal received has the certain reference signal pattern. In some embodiments, the method further includes determining to transmit the signaling, e.g., based on one or more of capability signaling received from the user equipment, information characterizing mobility of the user equipment and/or a speed of the user equipment, or information characterizing a type of deployment or coverage area of the radio network equipment (Block 710).

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 18:
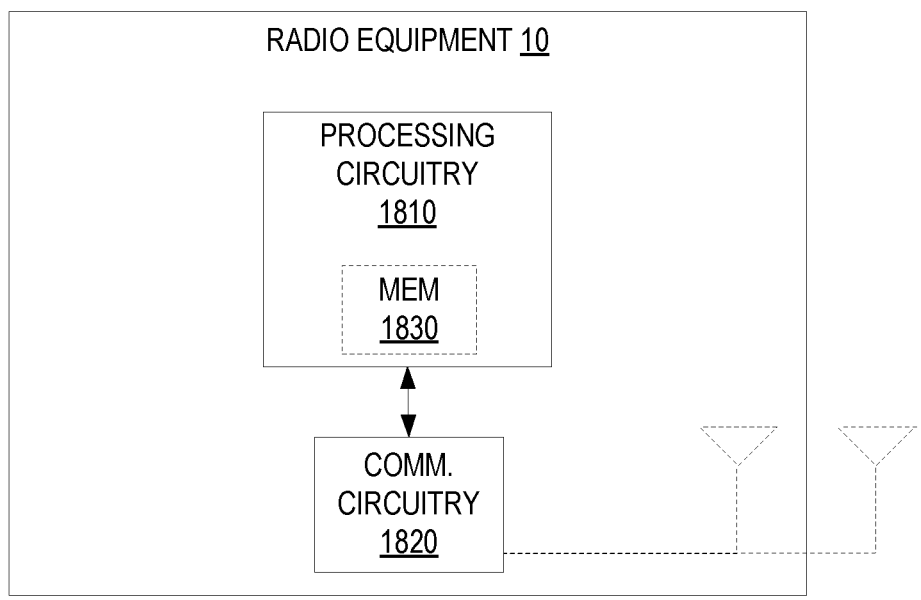
FIG. 18 is a block diagram of radio equipment according to some embodiments.

FIG. 18 for example illustrates radio equipment 10 (e.g., a wireless device or radio network equipment) as implemented in accordance with one or more embodiments. As shown, the radio equipment 10 includes processing circuitry 1810 and communication circuitry 1820. The communication circuitry 1820 (e.g., radio circuitry) is configured to transmit and/or receive information to and/or from one or more other nodes, e.g., via any communication technology. Such communication may occur via one or more antennas that are either internal or external to the radio equipment 10. The processing circuitry 1810 is configured to perform processing described above, such as by executing instructions stored in memory 1830. The processing circuitry 1810 in this regard may implement certain functional means, units, or modules.

Figure 19:
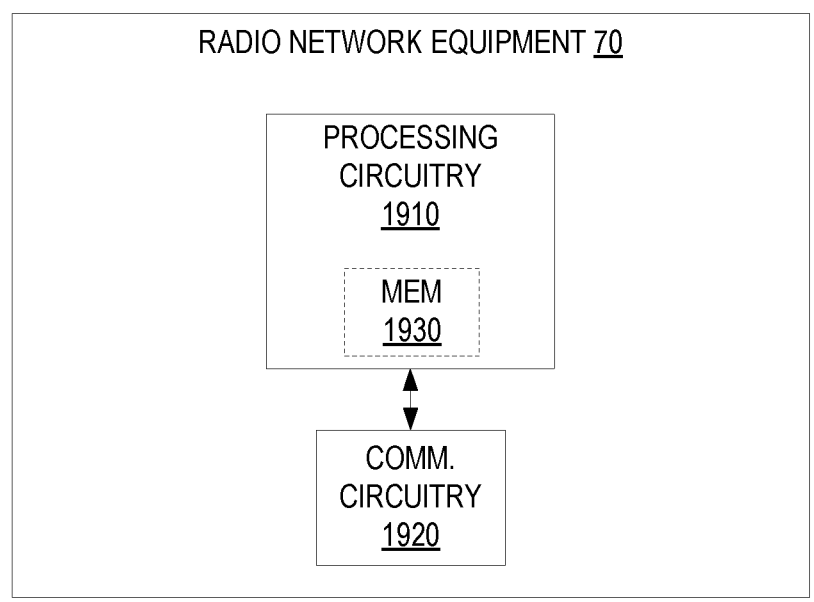
FIG. 19 is a block diagram of radio network equipment according to some embodiments.

FIG. 19 illustrates radio network equipment 70 as implemented in accordance with one or more embodiments. As shown, the radio network equipment 70 includes processing circuitry 1910 and communication circuitry 1920. The communication circuitry 1920 is configured to transmit and/or receive information to and/or from one or more other nodes, e.g., via any communication technology. The processing circuitry 1910 is configured to perform processing described above, such as by executing instructions stored in memory 1930. The processing circuitry 1910 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 20:
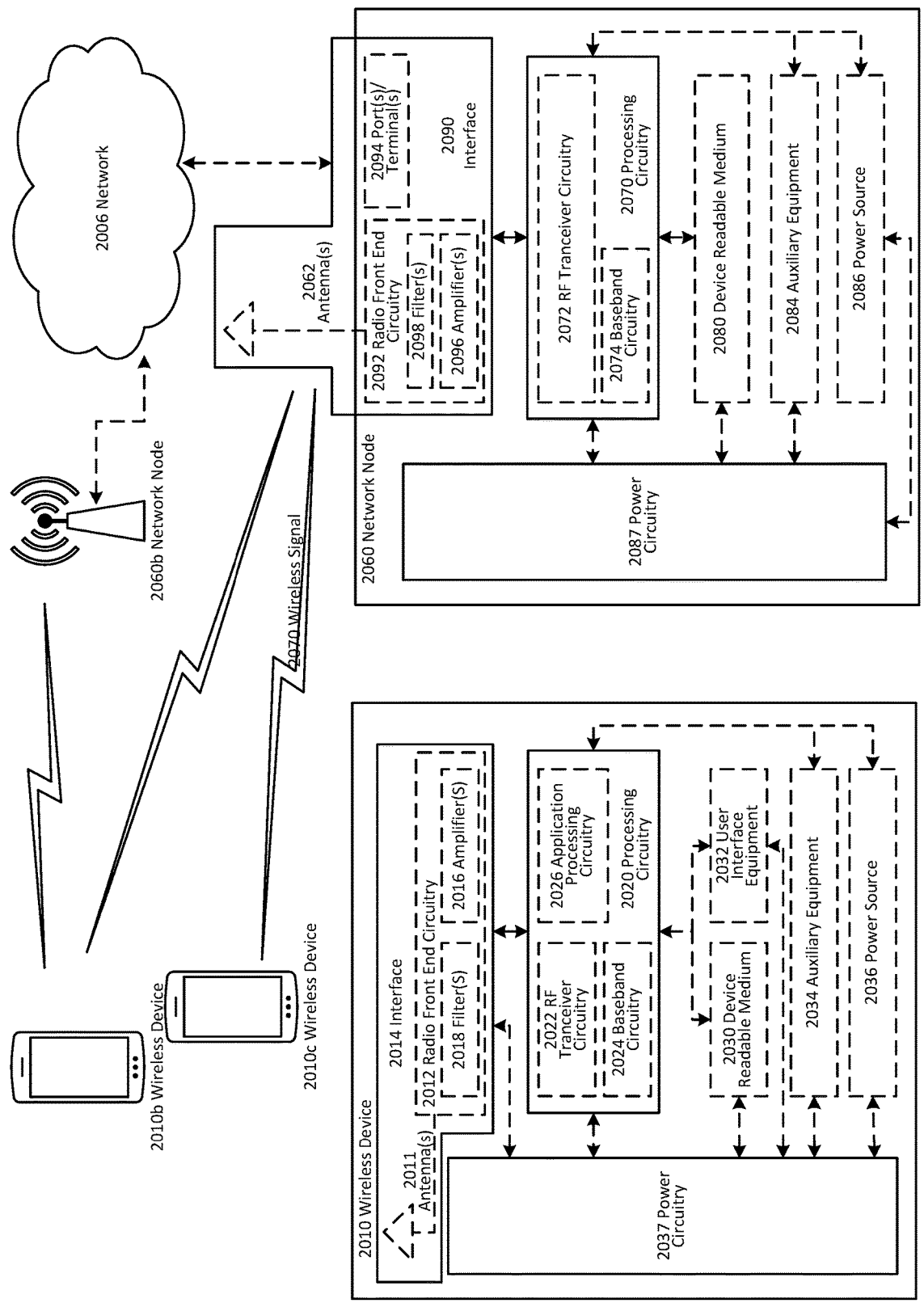
FIG. 20 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 20. For simplicity, the wireless network of FIG. 20 only depicts network 2006, network nodes 2060 and 2060b, and WDs 2010, 2010b, and 2010c. In practice, a wireless network may further include any additional elements suitable to support communication between wireless devices or between a wireless device and another communication device, such as a landline telephone, a service provider, or any other network node or end device. Of the illustrated components, network node 2060 and wireless device (WD) 2010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2060 and WD 2010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 20, network node 2060 includes processing circuitry 2070, device readable medium 2080, interface 2090, auxiliary equipment 2084, power source 2086, power circuitry 2087, and antenna 2062. Although network node 2060 illustrated in the example wireless network of FIG. 20 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 2060 are depicted as single boxes located within a larger box, or nested within multiple boxes, in practice, a network node may comprise multiple different physical components that make up a single illustrated component (e.g., device readable medium 2080 may comprise multiple separate hard drives as well as multiple RAM modules).

Similarly, network node 2060 may be composed of multiple physically separate components (e.g., a NodeB component and a RNC component, or a BTS component and a BSC component, etc.), which may each have their own respective components. In certain scenarios in which network node 2060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 2060 may be configured to support multiple radio access technologies (RATs). In such embodiments, some components may be duplicated (e.g., separate device readable medium 2080 for the different RATs) and some components may be reused (e.g., the same antenna 2062 may be shared by the RATs). Network node 2060 may also include multiple sets of the various illustrated components for different wireless technologies integrated into network node 2060, such as, for example, GSM, WCDMA, LTE, NR, WiFi, or Bluetooth wireless technologies. These wireless technologies may be integrated into the same or different chip or set of chips and other components within network node 2060.

Processing circuitry 2070 is configured to perform any determining, calculating, or similar operations (e.g., certain obtaining operations) described herein as being provided by a network node. These operations performed by processing circuitry 2070 may include processing information obtained by processing circuitry 2070 by, for example, converting the obtained information into other information, comparing the obtained information or converted information to information stored in the network node, and/or performing one or more operations based on the obtained information or converted information, and as a result of said processing making a determination.

Processing circuitry 2070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2060 components, such as device readable medium 2080, network node 2060 functionality. For example, processing circuitry 2070 may execute instructions stored in device readable medium 2080 or in memory within processing circuitry 2070. Such functionality may include providing any of the various wireless features, functions, or benefits discussed herein. In some embodiments, processing circuitry 2070 may include a system on a chip (SOC).

In some embodiments, processing circuitry 2070 may include one or more of radio frequency (RF) transceiver circuitry 2072 and baseband processing circuitry 2074. In some embodiments, radio frequency (RF) transceiver circuitry 2072 and baseband processing circuitry 2074 may be on separate chips (or sets of chips), boards, or units, such as radio units and digital units. In alternative embodiments, part or all of RF transceiver circuitry 2072 and baseband processing circuitry 2074 may be on the same chip or set of chips, boards, or units In certain embodiments, some or all of the functionality described herein as being provided by a network node, base station, eNB or other such network device may be performed by processing circuitry 2070 executing instructions stored on device readable medium 2080 or memory within processing circuitry 2070. In alternative embodiments, some or all of the functionality may be provided by processing circuitry 2070 without executing instructions stored on a separate or discrete device readable medium, such as in a hard-wired manner. In any of those embodiments, whether executing instructions stored on a device readable storage medium or not, processing circuitry 2070 can be configured to perform the described functionality. The benefits provided by such functionality are not limited to processing circuitry 2070 alone or to other components of network node 2060, but are enjoyed by network node 2060 as a whole, and/or by end users and the wireless network generally.

Device readable medium 2080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 2070. Device readable medium 2080 may store any suitable instructions, data or information, including a computer program, software, an application including one or more of logic, rules, code, tables, etc. and/or other instructions capable of being executed by processing circuitry 2070 and, utilized by network node 2060. Device readable medium 2080 may be used to store any calculations made by processing circuitry 2070 and/or any data received via interface 2090. In some embodiments, processing circuitry 2070 and device readable medium 2080 may be considered to be integrated.

Interface 2090 is used in the wired or wireless communication of signalling and/or data between network node 2060, network 2006, and/or WDs 2010. As illustrated, interface 2090 comprises port(s)/terminal(s) 2094 to send and receive data, for example to and from network 2006 over a wired connection. Interface 2090 also includes radio front end circuitry 2092 that may be coupled to, or in certain embodiments a part of, antenna 2062. Radio front end circuitry 2092 comprises filters 2098 and amplifiers 2096. Radio front end circuitry 2092 may be connected to antenna 2062 and processing circuitry 2070. Radio front end circuitry may be configured to condition signals communicated between antenna 2062 and processing circuitry 2070. Radio front end circuitry 2092 may receive digital data that is to be sent out to other network nodes or WDs via a wireless connection. Radio front end circuitry 2092 may convert the digital data into a radio signal having the appropriate channel and bandwidth parameters using a combination of filters 2098 and/or amplifiers 2096. The radio signal may then be transmitted via antenna 2062. Similarly, when receiving data, antenna 2062 may collect radio signals which are then converted into digital data by radio front end circuitry 2092. The digital data may be passed to processing circuitry 2070. In other embodiments, the interface may comprise different components and/or different combinations of components.

In certain alternative embodiments, network node 2060 may not include separate radio front end circuitry 2092, instead, processing circuitry 2070 may comprise radio front end circuitry and may be connected to antenna 2062 without separate radio front end circuitry 2092. Similarly, in some embodiments, all or some of RF transceiver circuitry 2072 may be considered a part of interface 2090. In still other embodiments, interface 2090 may include one or more ports or terminals 2094, radio front end circuitry 2092, and RF transceiver circuitry 2072, as part of a radio unit (not shown), and interface 2090 may communicate with baseband processing circuitry 2074, which is part of a digital unit (not shown).

Antenna 2062 may include one or more antennas, or antenna arrays, configured to send and/or receive wireless signals. Antenna 2062 may be coupled to radio front end circuitry 2090 and may be any type of antenna capable of transmitting and receiving data and/or signals wirelessly. In some embodiments, antenna 2062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 2062 may be separate from network node 2060 and may be connectable to network node 2060 through an interface or port.

Antenna 2062, interface 2090, and/or processing circuitry 2070 may be configured to perform any receiving operations and/or certain obtaining operations described herein as being performed by a network node. Any information, data and/or signals may be received from a wireless device, another network node and/or any other network equipment. Similarly, antenna 2062, interface 2090, and/or processing circuitry 2070 may be configured to perform any transmitting operations described herein as being performed by a network node. Any information, data and/or signals may be transmitted to a wireless device, another network node and/or any other network equipment.

Power circuitry 2087 may comprise, or be coupled to, power management circuitry and is configured to supply the components of network node 2060 with power for performing the functionality described herein. Power circuitry 2087 may receive power from power source 2086. Power source 2086 and/or power circuitry 2087 may be configured to provide power to the various components of network node 2060 in a form suitable for the respective components (e.g., at a voltage and current level needed for each respective component). Power source 2086 may either be included in, or external to, power circuitry 2087 and/or network node 2060. For example, network node 2060 may be connectable to an external power source (e.g., an electricity outlet) via an input circuitry or interface such as an electrical cable, whereby the external power source supplies power to power circuitry 2087. As a further example, power source 2086 may comprise a source of power in the form of a battery or battery pack which is connected to, or integrated in, power circuitry 2087. The battery may provide backup power should the external power source fail. Other types of power sources, such as photovoltaic devices, may also be used.

Alternative embodiments of network node 2060 may include additional components beyond those shown in FIG. 20 that may be responsible for providing certain aspects of the network node's functionality, including any of the functionality described herein and/or any functionality necessary to support the subject matter described herein. For example, network node 2060 may include user interface equipment to allow input of information into network node 2060 and to allow output of information from network node 2060. This may allow a user to perform diagnostic, maintenance, repair, and other administrative functions for network node 2060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 2010 includes antenna 2011, interface 2014, processing circuitry 2020, device readable medium 2030, user interface equipment 2032, auxiliary equipment 2034, power source 2036 and power circuitry 2037. WD 2010 may include multiple sets of one or more of the illustrated components for different wireless technologies supported by WD 2010, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 2010.

Antenna 2011 may include one or more antennas or antenna arrays, configured to send and/or receive wireless signals, and is connected to interface 2014. In certain alternative embodiments, antenna 2011 may be separate from WD 2010 and be connectable to WD 2010 through an interface or port. Antenna 2011, interface 2014, and/or processing circuitry 2020 may be configured to perform any receiving or transmitting operations described herein as being performed by a WD. Any information, data and/or signals may be received from a network node and/or another WD. In some embodiments, radio front end circuitry and/or antenna 2011 may be considered an interface.

As illustrated, interface 2014 comprises radio front end circuitry 2012 and antenna 2011. Radio front end circuitry 2012 comprise one or more filters 2018 and amplifiers 2016. Radio front end circuitry 2014 is connected to antenna 2011 and processing circuitry 2020, and is configured to condition signals communicated between antenna 2011 and processing circuitry 2020. Radio front end circuitry 2012 may be coupled to or a part of antenna 2011. In some embodiments, WD 2010 may not include separate radio front end circuitry 2012; rather, processing circuitry 2020 may comprise radio front end circuitry and may be connected to antenna 2011. Similarly, in some embodiments, some or all of RF transceiver circuitry 2022 may be considered a part of interface 2014. Radio front end circuitry 2012 may receive digital data that is to be sent out to other network nodes or WDs via a wireless connection. Radio front end circuitry 2012 may convert the digital data into a radio signal having the appropriate channel and bandwidth parameters using a combination of filters 2018 and/or amplifiers 2016. The radio signal may then be transmitted via antenna 2011. Similarly, when receiving data, antenna 2011 may collect radio signals which are then converted into digital data by radio front end circuitry 2012. The digital data may be passed to processing circuitry 2020. In other embodiments, the interface may comprise different components and/or different combinations of components.

Processing circuitry 2020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 2010 components, such as device readable medium 2030, WD 2010 functionality. Such functionality may include providing any of the various wireless features or benefits discussed herein. For example, processing circuitry 2020 may execute instructions stored in device readable medium 2030 or in memory within processing circuitry 2020 to provide the functionality disclosed herein.

As illustrated, processing circuitry 2020 includes one or more of RF transceiver circuitry 2022, baseband processing circuitry 2024, and application processing circuitry 2026. In other embodiments, the processing circuitry may comprise different components and/or different combinations of components. In certain embodiments processing circuitry 2020 of WD 2010 may comprise a SOC. In some embodiments, RF transceiver circuitry 2022, baseband processing circuitry 2024, and application processing circuitry 2026 may be on separate chips or sets of chips. In alternative embodiments, part or all of baseband processing circuitry 2024 and application processing circuitry 2026 may be combined into one chip or set of chips, and RF transceiver circuitry 2022 may be on a separate chip or set of chips. In still alternative embodiments, part or all of RF transceiver circuitry 2022 and baseband processing circuitry 2024 may be on the same chip or set of chips, and application processing circuitry 2026 may be on a separate chip or set of chips. In yet other alternative embodiments, part or all of RF transceiver circuitry 2022, baseband processing circuitry 2024, and application processing circuitry 2026 may be combined in the same chip or set of chips. In some embodiments, RF transceiver circuitry 2022 may be a part of interface 2014. RF transceiver circuitry 2022 may condition RF signals for processing circuitry 2020.

In certain embodiments, some or all of the functionality described herein as being performed by a WD may be provided by processing circuitry 2020 executing instructions stored on device readable medium 2030, which in certain embodiments may be a computer-readable storage medium. In alternative embodiments, some or all of the functionality may be provided by processing circuitry 2020 without executing instructions stored on a separate or discrete device readable storage medium, such as in a hard-wired manner. In any of those particular embodiments, whether executing instructions stored on a device readable storage medium or not, processing circuitry 2020 can be configured to perform the described functionality. The benefits provided by such functionality are not limited to processing circuitry 2020 alone or to other components of WD 2010, but are enjoyed by WD 2010 as a whole, and/or by end users and the wireless network generally.

Processing circuitry 2020 may be configured to perform any determining, calculating, or similar operations (e.g., certain obtaining operations) described herein as being performed by a WD. These operations, as performed by processing circuitry 2020, may include processing information obtained by processing circuitry 2020 by, for example, converting the obtained information into other information, comparing the obtained information or converted information to information stored by WD 2010, and/or performing one or more operations based on the obtained information or converted information, and as a result of said processing making a determination.

Device readable medium 2030 may be operable to store a computer program, software, an application including one or more of logic, rules, code, tables, etc. and/or other instructions capable of being executed by processing circuitry 2020. Device readable medium 2030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 2020. In some embodiments, processing circuitry 2020 and device readable medium 2030 may be considered to be integrated.

User interface equipment 2032 may provide components that allow for a human user to interact with WD 2010. Such interaction may be of many forms, such as visual, audial, tactile, etc. User interface equipment 2032 may be operable to produce output to the user and to allow the user to provide input to WD 2010. The type of interaction may vary depending on the type of user interface equipment 2032 installed in WD 2010. For example, if WD 2010 is a smart phone, the interaction may be via a touch screen; if WD 2010 is a smart meter, the interaction may be through a screen that provides usage (e.g., the number of gallons used) or a speaker that provides an audible alert (e.g., if smoke is detected). User interface equipment 2032 may include input interfaces, devices and circuits, and output interfaces, devices and circuits. User interface equipment 2032 is configured to allow input of information into WD 2010, and is connected to processing circuitry 2020 to allow processing circuitry 2020 to process the input information. User interface equipment 2032 may include, for example, a microphone, a proximity or other sensor, keys/buttons, a touch display, one or more cameras, a USB port, or other input circuitry. User interface equipment 2032 is also configured to allow output of information from WD 2010, and to allow processing circuitry 2020 to output information from WD 2010. User interface equipment 2032 may include, for example, a speaker, a display, vibrating circuitry, a USB port, a headphone interface, or other output circuitry. Using one or more input and output interfaces, devices, and circuits, of user interface equipment 2032, WD 2010 may communicate with end users and/or the wireless network, and allow them to benefit from the functionality described herein.

Auxiliary equipment 2034 is operable to provide more specific functionality which may not be generally performed by WDs. This may comprise specialized sensors for doing measurements for various purposes, interfaces for additional types of communication such as wired communications etc. The inclusion and type of components of auxiliary equipment 2034 may vary depending on the embodiment and/or scenario.

Power source 2036 may, in some embodiments, be in the form of a battery or battery pack. Other types of power sources, such as an external power source (e.g., an electricity outlet), photovoltaic devices or power cells, may also be used. WD 2010 may further comprise power circuitry 2037 for delivering power from power source 2036 to the various parts of WD 2010 which need power from power source 2036 to carry out any functionality described or indicated herein. Power circuitry 2037 may in certain embodiments comprise power management circuitry. Power circuitry 2037 may additionally or alternatively be operable to receive power from an external power source; in which case WD 2010 may be connectable to the external power source (such as an electricity outlet) via input circuitry or an interface such as an electrical power cable. Power circuitry 2037 may also in certain embodiments be operable to deliver power from an external power source to power source 2036. This may be, for example, for the charging of power source 2036. Power circuitry 2037 may perform any formatting, converting, or other modification to the power from power source 2036 to make the power suitable for the respective components of WD 2010 to which power is supplied.

Figure 21:
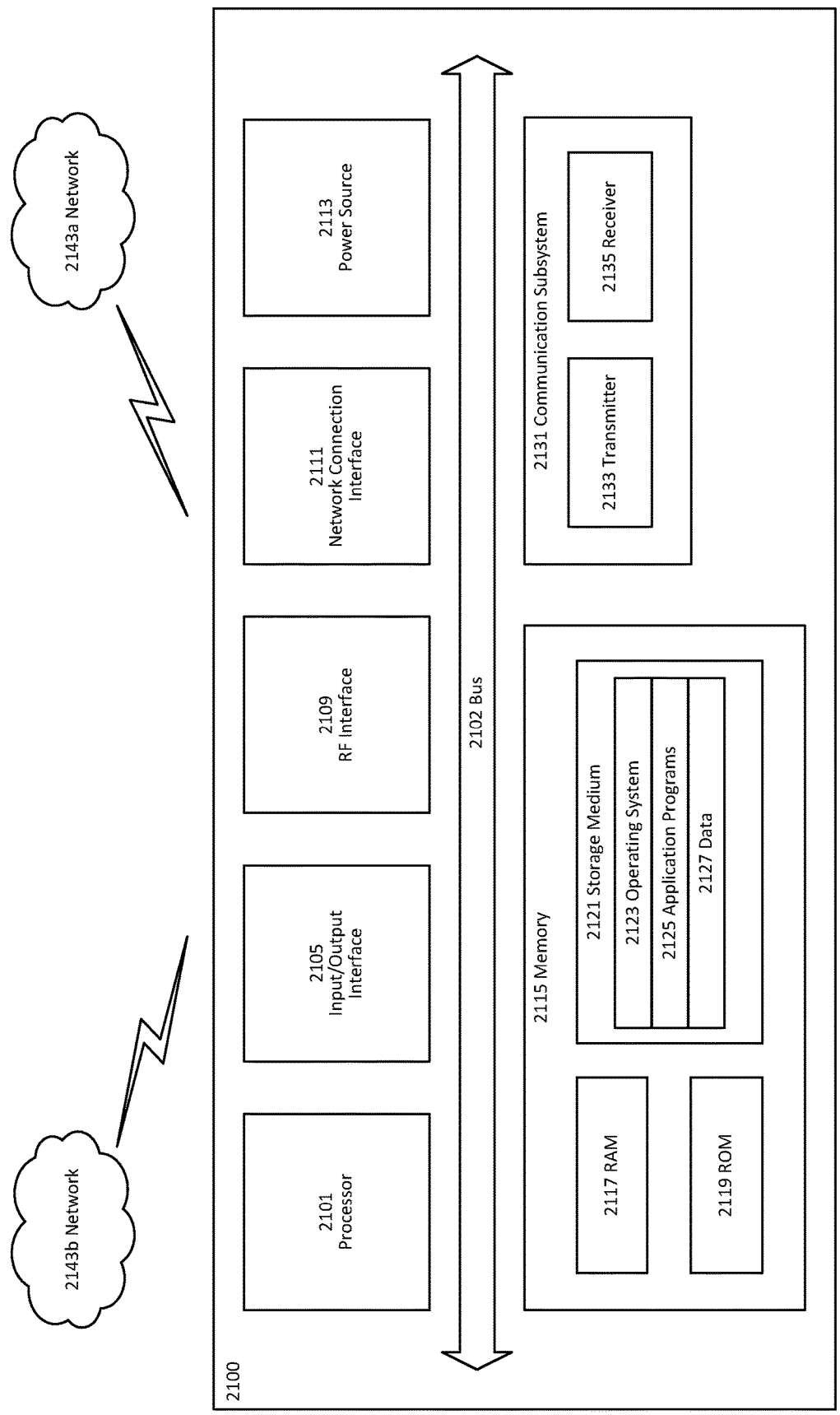
FIG. 21 is a block diagram of a user equipment according to some embodiments.

FIG. 21 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 21200 may be any UE identified by the $3^{rd}$ Generation Partnership Project (3GPP), including a NB-IoT UE, a machine type communication (MTC) UE, and/or an enhanced MTC (eMTC) UE. UE 2100, as illustrated in FIG. 21, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 21 is a UE, the components discussed herein are equally applicable to a WD, and vice-versa.

In FIG. 21, UE 2100 includes processing circuitry 2101 that is operatively coupled to input/output interface 2105, radio frequency (RF) interface 2109, network connection interface 2111, memory 2115 including random access memory (RAM) 2117, read-only memory (ROM) 2119, and storage medium 2121 or the like, communication subsystem 2131, power source 2133, and/or any other component, or any combination thereof. Storage medium 2121 includes operating system 2123, application program 2125, and data 2127. In other embodiments, storage medium 2121 may include other similar types of information. Certain UEs may utilize all of the components shown in FIG. 21, or only a subset of the components. The level of integration between the components may vary from one UE to another UE. Further, certain UEs may contain multiple instances of a component, such as multiple processors, memories, transceivers, transmitters, receivers, etc.

In FIG. 21, processing circuitry 2101 may be configured to process computer instructions and data. Processing circuitry 2101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2101 may include two central processing units (CPUs). Data may be information in a form suitable for use by a computer.

In the depicted embodiment, input/output interface 2105 may be configured to provide a communication interface to an input device, output device, or input and output device. UE 2100 may be configured to use an output device via input/output interface 2105. An output device may use the same type of interface port as an input device. For example, a USB port may be used to provide input to and output from UE 2100. The output device may be a speaker, a sound card, a video card, a display, a monitor, a printer, an actuator, an emitter, a smartcard, another output device, or any combination thereof. UE 2100 may be configured to use an input device via input/output interface 2105 to allow a user to capture information into UE 2100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 21, RF interface 2109 may be configured to provide a communication interface to RF components such as a transmitter, a receiver, and an antenna. Network connection interface 2111 may be configured to provide a communication interface to network 2143a. Network 2143a may encompass wired and/or wireless networks such as a local-area network (LAN), a wide-area network (WAN), a computer network, a wireless network, a telecommunications network, another like network or any combination thereof. For example, network 2143a may comprise a Wi-Fi network. Network connection interface 2111 may be configured to include a receiver and a transmitter interface used to communicate with one or more other devices over a communication network according to one or more communication protocols, such as Ethernet, TCP/IP, SONET, ATM, or the like. Network connection interface 2111 may implement receiver and transmitter functionality appropriate to the communication network links (e.g., optical, electrical, and the like). The transmitter and receiver functions may share circuit components, software or firmware, or alternatively may be implemented separately.

RAM 2117 may be configured to interface via bus 2102 to processing circuitry 2101 to provide storage or caching of data or computer instructions during the execution of software programs such as the operating system, application programs, and device drivers. ROM 2119 may be configured to provide computer instructions or data to processing circuitry 2101. For example, ROM 2119 may be configured to store invariant low-level system code or data for basic system functions such as basic input and output (I/O), startup, or reception of keystrokes from a keyboard that are stored in a non-volatile memory. Storage medium 2121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2121 may be configured to include operating system 2123, application program 2125 such as a web browser application, a widget or gadget engine or another application, and data file 2127. Storage medium 2121 may store, for use by UE 2100, any of a variety of various operating systems or combinations of operating systems.

Storage medium 2121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2121 may allow UE 2100 to access computer-executable instructions, application programs or the like, stored on transitory or non-transitory memory media, to off-load data, or to upload data. An article of manufacture, such as one utilizing a communication system may be tangibly embodied in storage medium 2121, which may comprise a device readable medium.

In FIG. 21, processing circuitry 2101 may be configured to communicate with network 2143*b* using communication subsystem 2131. Network 2143*a* and network 2143*b* may be the same network or networks or different network or networks. Communication subsystem 2131 may be configured to include one or more transceivers used to communicate with network 2143*b*. For example, communication subsystem 2131 may be configured to include one or more transceivers used to communicate with one or more remote transceivers of another device capable of wireless communication such as another WD, UE, or base station of a radio access network (RAN) according to one or more communication protocols, such as IEEE 802.21, CDMA, WCDMA, GSM, LTE, UTRAN, WiMax, or the like. Each transceiver may include transmitter 2133 and/or receiver 2135 to implement transmitter or receiver functionality, respectively, appropriate to the RAN links (e.g., frequency allocations and the like). Further, transmitter 2133 and receiver 2135 of each transceiver may share circuit components, software or firmware, or alternatively may be implemented separately.

In the illustrated embodiment, the communication functions of communication subsystem 2131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2131 may include cellular communication, Wi-Fi communication, Bluetooth communication, and GPS communication. Network 2143*b* may encompass wired and/or wireless networks such as a local-area network (LAN), a wide-area network (WAN), a computer network, a wireless network, a telecommunications network, another like network or any combination thereof. For example, network 2143*b* may be a cellular network, a Wi-Fi network, and/or a near-field network. Power source 2113 may be configured to provide alternating current (AC) or direct current (DC) power to components of UE 2100.

The features, benefits and/or functions described herein may be implemented in one of the components of UE 2100 or partitioned across multiple components of UE 2100. Further, the features, benefits, and/or functions described herein may be implemented in any combination of hardware, software or firmware. In one example, communication subsystem 2131 may be configured to include any of the components described herein. Further, processing circuitry 2101 may be configured to communicate with any of such components over bus 2102. In another example, any of such components may be represented by program instructions stored in memory that when executed by processing circuitry 2101 perform the corresponding functions described herein. In another example, the functionality of any of such components may be partitioned between processing circuitry 2101 and communication subsystem 2131. In another example, the non-computationally intensive functions of any of such components may be implemented in software or firmware and the computationally intensive functions may be implemented in hardware.

Figure 22:
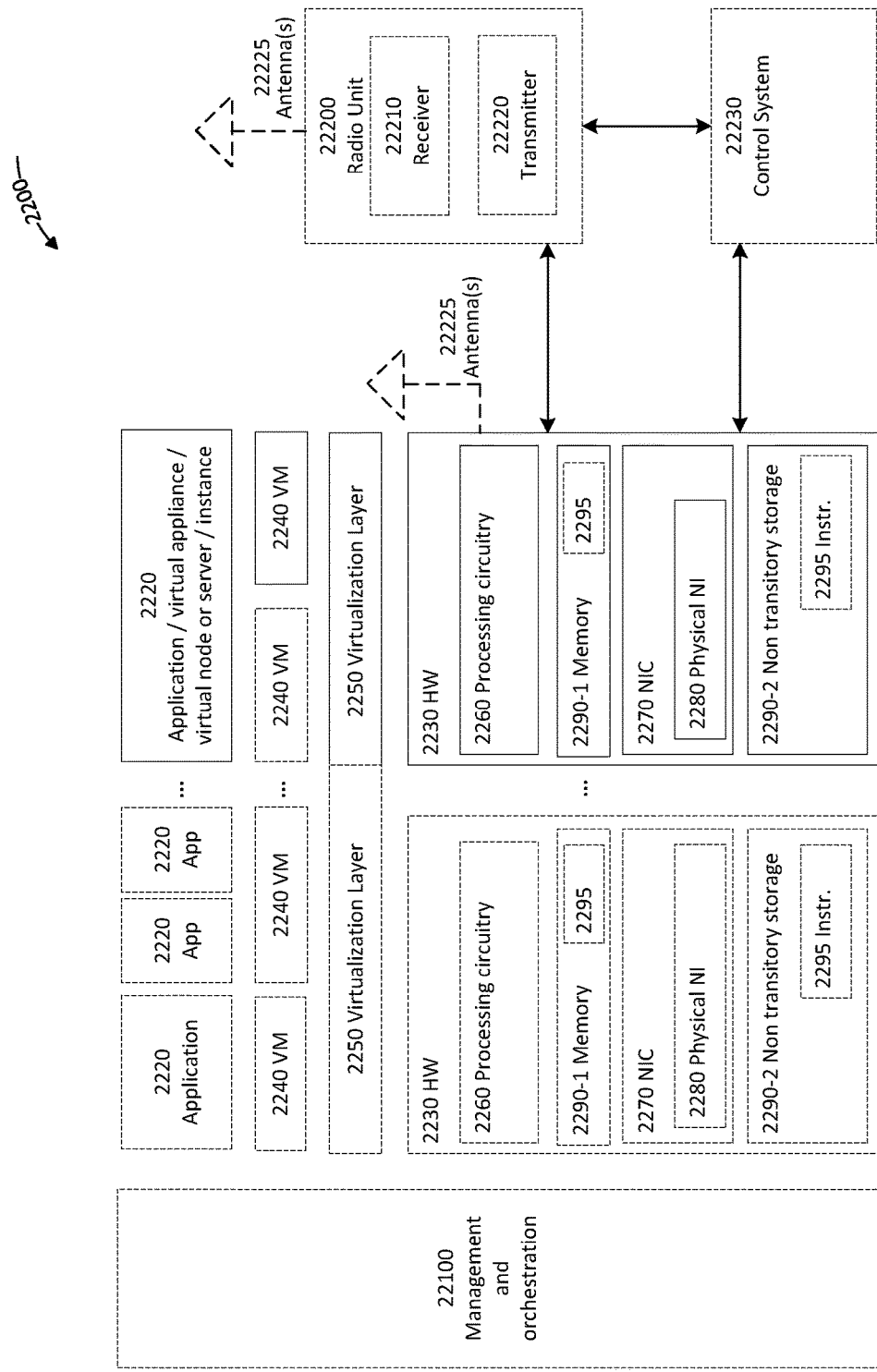
FIG. 22 is a block diagram of a virtualization environment according to some embodiments.

FIG. 22 is a schematic block diagram illustrating a virtualization environment 2200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2200 hosted by one or more of hardware nodes 2230. Further, in embodiments in which the virtual node is not a radio access node or does not require radio connectivity (e.g., a core network node), then the network node may be entirely virtualized.

The functions may be implemented by one or more applications 2220 (which may alternatively be called software instances, virtual appliances, network functions, virtual nodes, virtual network functions, etc.) operative to implement some of the features, functions, and/or benefits of some of the embodiments disclosed herein. Applications 2220 are run in virtualization environment 2200 which provides hardware 2230 comprising processing circuitry 2260 and memory 2290. Memory 2290 contains instructions 2295 executable by processing circuitry 2260 whereby application 2220 is operative to provide one or more of the features, benefits, and/or functions disclosed herein.

Virtualization environment 2200, comprises general-purpose or special-purpose network hardware devices 2230 comprising a set of one or more processors or processing circuitry 2260, which may be commercial off-the-shelf (COTS) processors, dedicated Application Specific Integrated Circuits (ASICs), or any other type of processing circuitry including digital or analog hardware components or special purpose processors. Each hardware device may comprise memory 2290-1 which may be non-persistent memory for temporarily storing instructions 2295 or software executed by processing circuitry 2260. Each hardware device may comprise one or more network interface controllers (NICs) 2270, also known as network interface cards, which include physical network interface 2280. Each hardware device may also include non-transitory, persistent, machine-readable storage media 2290-2 having stored therein software 2295 and/or instructions executable by processing circuitry 2260. Software 2295 may include any type of software including software for instantiating one or more virtualization layers 2250 (also referred to as hypervisors), software to execute virtual machines 2240 as well as software allowing it to execute functions, features and/or benefits described in relation with some embodiments described herein.

Virtual machines 2240, comprise virtual processing, virtual memory, virtual networking or interface and virtual storage, and may be run by a corresponding virtualization layer 2250 or hypervisor. Different embodiments of the instance of virtual appliance 2220 may be implemented on one or more of virtual machines 2240, and the implementations may be made in different ways.

During operation, processing circuitry 2260 executes software 2295 to instantiate the hypervisor or virtualization layer 2250, which may sometimes be referred to as a virtual machine monitor (VMM). Virtualization layer 2250 may present a virtual operating platform that appears like networking hardware to virtual machine 2240.

As shown in FIG. 22, hardware 2230 may be a standalone network node with generic or specific components. Hardware 2230 may comprise antenna 22225 and may implement some functions via virtualization. Alternatively, hardware 2230 may be part of a larger cluster of hardware (e.g. such as in a data center or customer premise equipment (CPE)) where many hardware nodes work together and are managed via management and orchestration (MANO) 22100, which, among others, oversees lifecycle management of applications 2220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2240 may be a software implementation of a physical machine that runs programs as if they were executing on a physical, non-virtualized machine. Each of virtual machines 2240, and that part of hardware 2230 that executes that virtual machine, be it hardware dedicated to that virtual machine and/or hardware shared by that virtual machine with others of the virtual machines 2240, forms a separate virtual network elements (VNE).

Still in the context of NFV, Virtual Network Function (VNF) is responsible for handling specific network functions that run in one or more virtual machines 2240 on top of hardware networking infrastructure 2230 and corresponds to application 2220 in FIG. 22.

In some embodiments, one or more radio units 22200 that each include one or more transmitters 22220 and one or more receivers 22210 may be coupled to one or more antennas 22225. Radio units 22200 may communicate directly with hardware nodes 2230 via one or more appropriate network interfaces and may be used in combination with the virtual components to provide a virtual node with radio capabilities, such as a radio access node or a base station.

In some embodiments, some signalling can be effected with the use of control system 22230 which may alternatively be used for communication between the hardware nodes 2230 and radio units 22200.

Figure 23:
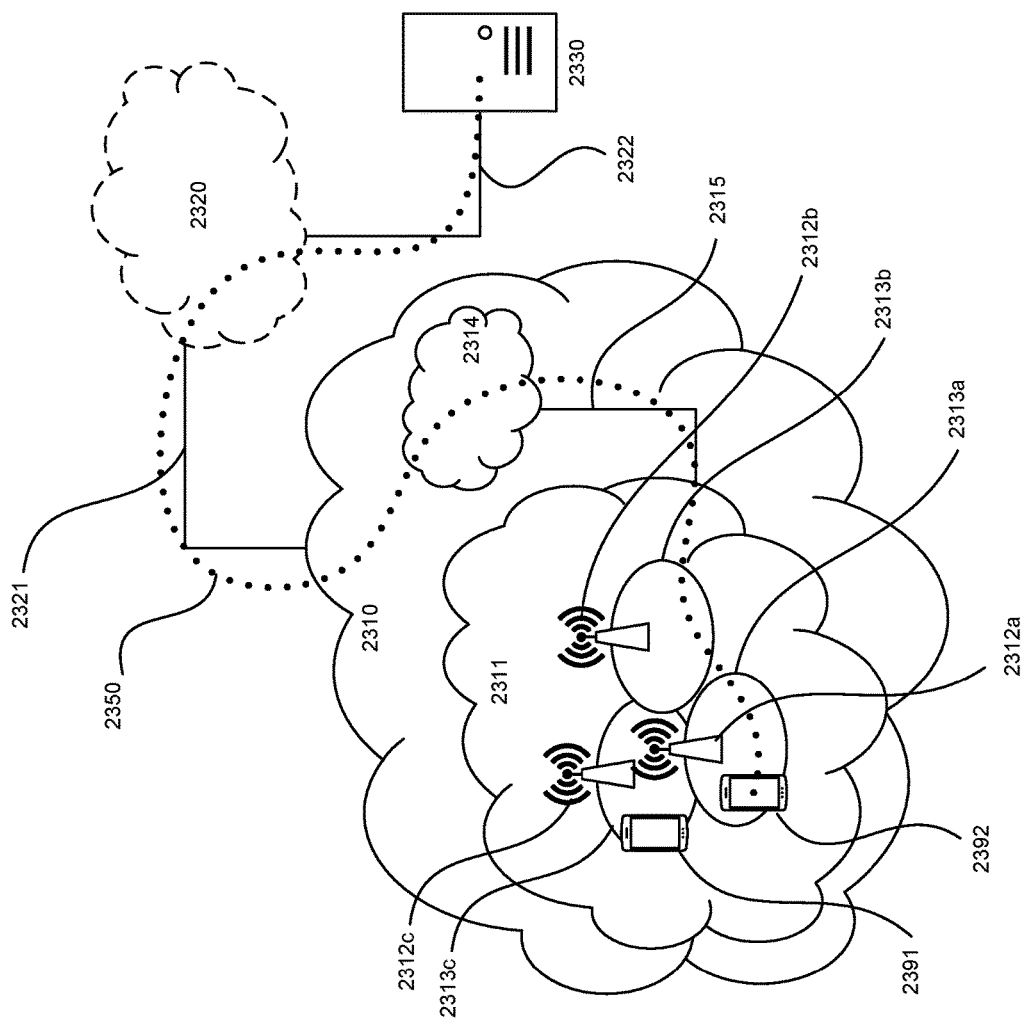
FIG. 23 is a block diagram of a communication network with a host computer according to some embodiments.

FIG. 23 illustrates a telecommunication network connected via an intermediate network to a host computer in accordance with some embodiments. In particular, with reference to FIG. 23, in accordance with an embodiment, a communication system includes telecommunication network 2310, such as a 3GPP-type cellular network, which comprises access network 2311, such as a radio access network, and core network 2314. Access network 2311 comprises a plurality of base stations 2312a, 2312b, 2312c, such as NBs, eNBs, gNBs or other types of wireless access points, each defining a corresponding coverage area 2313a, 2313b, 2313c. Each base station 2312a, 2312b, 2312c is connectable to core network 2314 over a wired or wireless connection 2315. A first UE 2391 located in coverage area 2313c is configured to wirelessly connect to, or be paged by, the corresponding base station 2312c. A second UE 2392 in coverage area 2313a is wirelessly connectable to the corresponding base station 2312a. While a plurality of UEs 2391, 2392 are illustrated in this example, the disclosed embodiments are equally applicable to a situation where a sole UE is in the coverage area or where a sole UE is connecting to the corresponding base station 2312.

Telecommunication network 2310 is itself connected to host computer 2330, which may be embodied in the hardware and/or software of a standalone server, a cloud-implemented server, a distributed server or as processing resources in a server farm. Host computer 2330 may be under the ownership or control of a service provider, or may be operated by the service provider or on behalf of the service provider. Connections 2321 and 2322 between telecommunication network 2310 and host computer 2330 may extend directly from core network 2314 to host computer 2330 or may go via an optional intermediate network 2320. Intermediate network 2320 may be one of, or a combination of more than one of, a public, private or hosted network; intermediate network 2320, if any, may be a backbone network or the Internet; in particular, intermediate network 2320 may comprise two or more sub-networks (not shown).

The communication system of FIG. 23 as a whole enables connectivity between the connected UEs 2391, 2392 and host computer 2330. The connectivity may be described as an over-the-top (OTT) connection 2350. Host computer 2330 and the connected UEs 2391, 2392 are configured to communicate data and/or signaling via OTT connection 2350, using access network 2311, core network 2314, any intermediate network 2320 and possible further infrastructure (not shown) as intermediaries. OTT connection 2350 may be transparent in the sense that the participating communication devices through which OTT connection 2350 passes are unaware of routing of uplink and downlink communications. For example, base station 2312 may not or need not be informed about the past routing of an incoming downlink communication with data originating from host computer 2330 to be forwarded (e.g., handed over) to a connected UE 2391. Similarly, base station 2312 need not be aware of the future routing of an outgoing uplink communication originating from the UE 2391 towards the host computer 2330.

Figure 24:
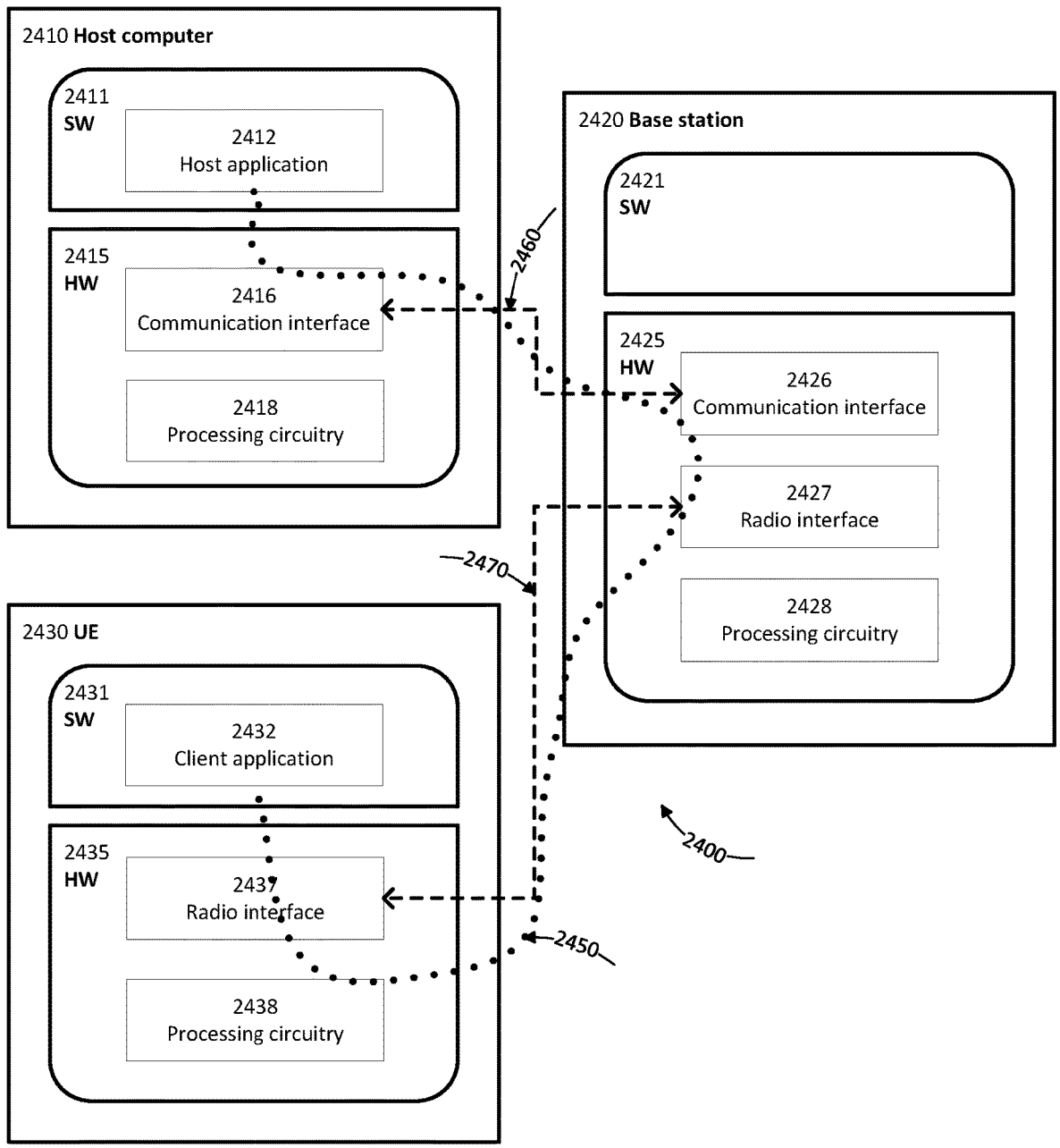
FIG. 24 is a block diagram of a host computer according to some embodiments.

Example implementations, in accordance with an embodiment, of the UE, base station and host computer discussed in the preceding paragraphs will now be described with reference to FIG. 24. FIG. 24 illustrates host computer communicating via a base station with a user equipment over a partially wireless connection in accordance with some embodiments In communication system 2400, host computer 2410 comprises hardware 2415 including communication interface 2416 configured to set up and maintain a wired or wireless connection with an interface of a different communication device of communication system 2400. Host computer 2410 further comprises processing circuitry 2418, which may have storage and/or processing capabilities. In particular, processing circuitry 2418 may comprise one or more programmable processors, application-specific integrated circuits, field programmable gate arrays or combinations of these (not shown) adapted to execute instructions. Host computer 2410 further comprises software 2411, which is stored in or accessible by host computer 2410 and executable by processing circuitry 2418. Software 2411 includes host application 2412. Host application 2412 may be operable to provide a service to a remote user, such as UE 2430 connecting via OTT connection 2450 terminating at UE 2430 and host computer 2410. In providing the service to the remote user, host application 2412 may provide user data which is transmitted using OTT connection 2450.

Communication system 2400 further includes base station 2420 provided in a telecommunication system and comprising hardware 2425 enabling it to communicate with host computer 2410 and with UE 2430. Hardware 2425 may include communication interface 2426 for setting up and maintaining a wired or wireless connection with an interface of a different communication device of communication system 2400, as well as radio interface 2427 for setting up and maintaining at least wireless connection 2470 with UE 2430 located in a coverage area (not shown in FIG. 24) served by base station 2420. Communication interface 2426 may be configured to facilitate connection 2460 to host computer 2410. Connection 2460 may be direct or it may pass through a core network (not shown in FIG. 24) of the telecommunication system and/or through one or more intermediate networks outside the telecommunication system. In the embodiment shown, hardware 2425 of base station 2420 further includes processing circuitry 2428, which may comprise one or more programmable processors, application-specific integrated circuits, field programmable gate arrays or combinations of these (not shown) adapted to execute instructions. Base station 2420 further has software 2421 stored internally or accessible via an external connection.

Communication system 2400 further includes UE 2430 already referred to. Its hardware 2435 may include radio interface 2437 configured to set up and maintain wireless connection 2470 with a base station serving a coverage area in which UE 2430 is currently located. Hardware 2435 of UE 2430 further includes processing circuitry 2438, which may comprise one or more programmable processors, application-specific integrated circuits, field programmable gate arrays or combinations of these (not shown) adapted to execute instructions. UE 2430 further comprises software 2431, which is stored in or accessible by UE 2430 and executable by processing circuitry 2438. Software 2431 includes client application 2432. Client application 2432 may be operable to provide a service to a human or non-human user via UE 2430, with the support of host computer 2410. In host computer 2410, an executing host application 2412 may communicate with the executing client application 2432 via OTT connection 2450 terminating at UE 2430 and host computer 2410. In providing the service to the user, client application 2432 may receive request data from host application 2412 and provide user data in response to the request data. OTT connection 2450 may transfer both the request data and the user data. Client application 2432 may interact with the user to generate the user data that it provides.

It is noted that host computer 2410, base station 2420 and UE 2430 illustrated in FIG. 24 may be similar or identical to host computer 2330, one of base stations 2312a, 2312b, 2312c and one of UEs 2391, 2392 of FIG. 23, respectively. This is to say, the inner workings of these entities may be as shown in FIG. 24 and independently, the surrounding network topology may be that of FIG. 23.

In FIG. 24, OTT connection 2450 has been drawn abstractly to illustrate the communication between host computer 2410 and UE 2430 via base station 2420, without explicit reference to any intermediary devices and the precise routing of messages via these devices. Network infrastructure may determine the routing, which it may be configured to hide from UE 2430 or from the service provider operating host computer 2410, or both. While OTT connection 2450 is active, the network infrastructure may further take decisions by which it dynamically changes the routing (e.g., on the basis of load balancing consideration or reconfiguration of the network).

Wireless connection 2470 between UE 2430 and base station 2420 is in accordance with the teachings of the embodiments described throughout this disclosure. One or more of the various embodiments improve the performance of OTT services provided to UE 2430 using OTT connection 2450, in which wireless connection 2470 forms the last segment. More precisely, the teachings of these embodiments may improve the data throughput and/or reference signal overhead and thereby provide benefits such as reduced user waiting time and relaxed restriction on file size.

A measurement procedure may be provided for the purpose of monitoring data rate, latency and other factors on which the one or more embodiments improve. There may further be an optional network functionality for reconfiguring OTT connection 2450 between host computer 2410 and UE 2430, in response to variations in the measurement results. The measurement procedure and/or the network functionality for reconfiguring OTT connection 2450 may be implemented in software 2411 and hardware 2415 of host computer 2410 or in software 2431 and hardware 2435 of UE 2430, or both. In embodiments, sensors (not shown) may be deployed in or in association with communication devices through which OTT connection 2450 passes; the sensors may participate in the measurement procedure by supplying values of the monitored quantities exemplified above, or supplying values of other physical quantities from which software 2411, 2431 may compute or estimate the monitored quantities. The reconfiguring of OTT connection 2450 may include message format, retransmission settings, preferred routing etc.; the reconfiguring need not affect base station 2420, and it may be unknown or imperceptible to base station 2420. Such procedures and functionalities may be known and practiced in the art. In certain embodiments, measurements may involve proprietary UE signaling facilitating host computer 2410's measurements of throughput, propagation times, latency and the like. The measurements may be implemented in that software 2411 and 2431 causes messages to be transmitted, in particular empty or 'dummy' messages, using OTT connection 2450 while it monitors propagation times, errors etc.

Figure 25:
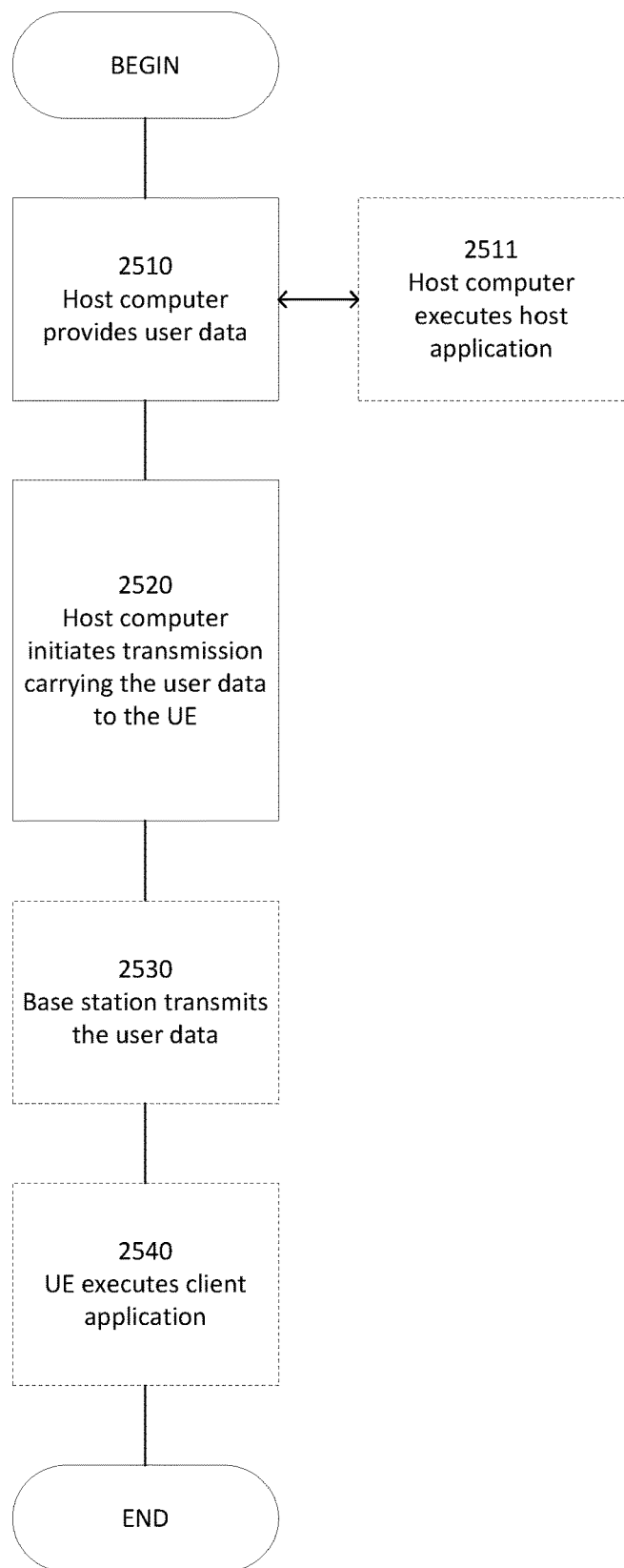
FIG. 25 is a flowchart illustrating a method implemented in a communication system, in accordance with one embodiment.

FIG. 25 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 25 will be included in this section. In step 2510, the host computer provides user data. In substep 2511 (which may be optional) of step 2510, the host computer provides the user data by executing a host application. In step 2520, the host computer initiates a transmission carrying the user data to the UE. In step 2530 (which may be optional), the base station transmits to the UE the user data which was carried in the transmission that the host computer initiated, in accordance with the teachings of the embodiments described throughout this disclosure. In step 2540 (which may also be optional), the UE executes a client application associated with the host application executed by the host computer.

Figure 26:
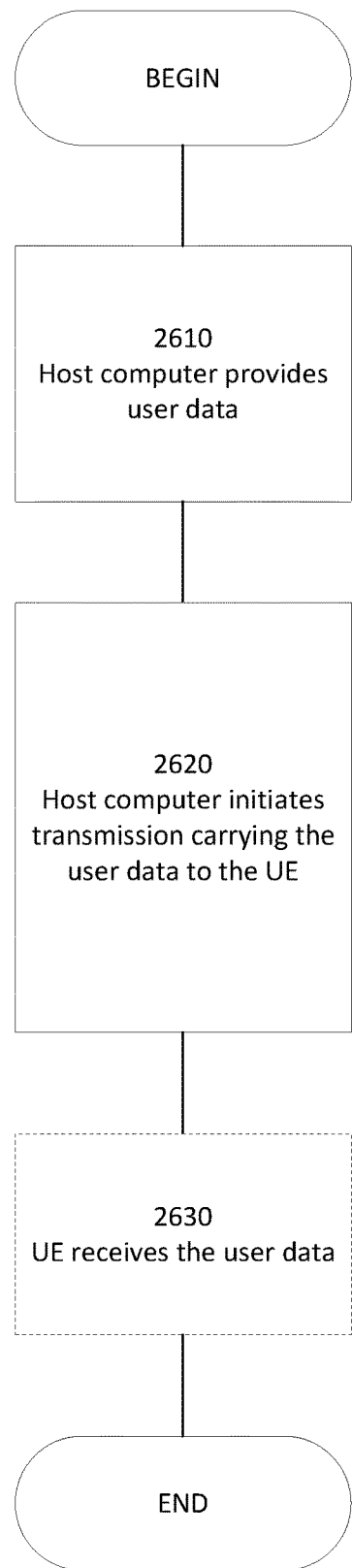
FIG. 26 is a flowchart illustrating a method implemented in a communication system, in accordance with one embodiment.

FIG. 26 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 26 will be included in this section. In step 2610 of the method, the host computer provides user data. In an optional substep (not shown) the host computer provides the user data by executing a host application. In step 2620, the host computer initiates a transmission carrying the user data to the UE. The transmission may pass via the base station, in accordance with the teachings of the embodiments described throughout this disclosure. In step 2630 (which may be optional), the UE receives the user data carried in the transmission.

Figure 27:
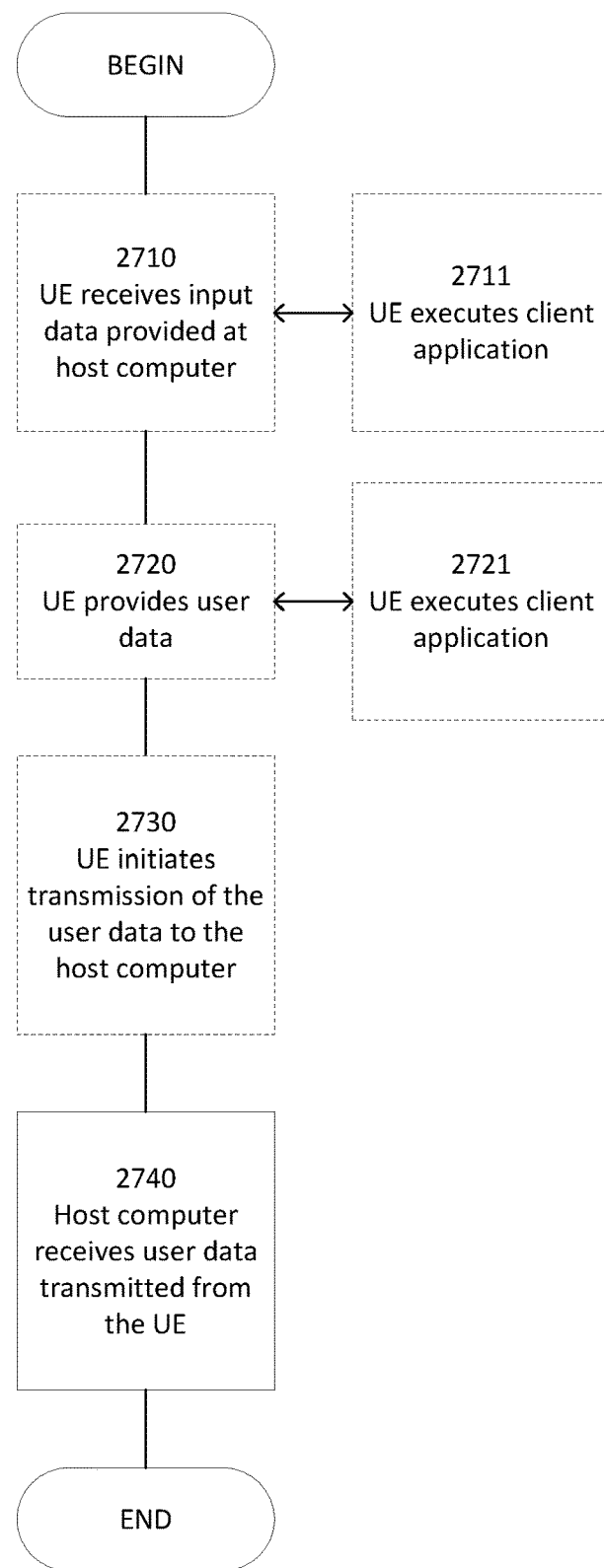
FIG. 27 is a flowchart illustrating a method implemented in a communication system, in accordance with one embodiment.

FIG. 27 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 27 will be included in this section. In step 2710 (which may be optional), the UE receives input data provided by the host computer. Additionally or alternatively, in step 2720, the UE provides user data. In substep 2721 (which may be optional) of step 2720, the UE provides the user data by executing a client application. In substep 2711 (which may be optional) of step 2710, the UE executes a client application which provides the user data in reaction to the received input data provided by the host computer. In providing the user data, the executed client application may further consider user input received from the user. Regardless of the specific manner in which the user data was provided, the UE initiates, in substep 2730 (which may be optional), transmission of the user data to the host computer. In step 2740 of the method, the host computer receives the user data transmitted from the UE, in accordance with the teachings of the embodiments described throughout this disclosure.

Figure 28:
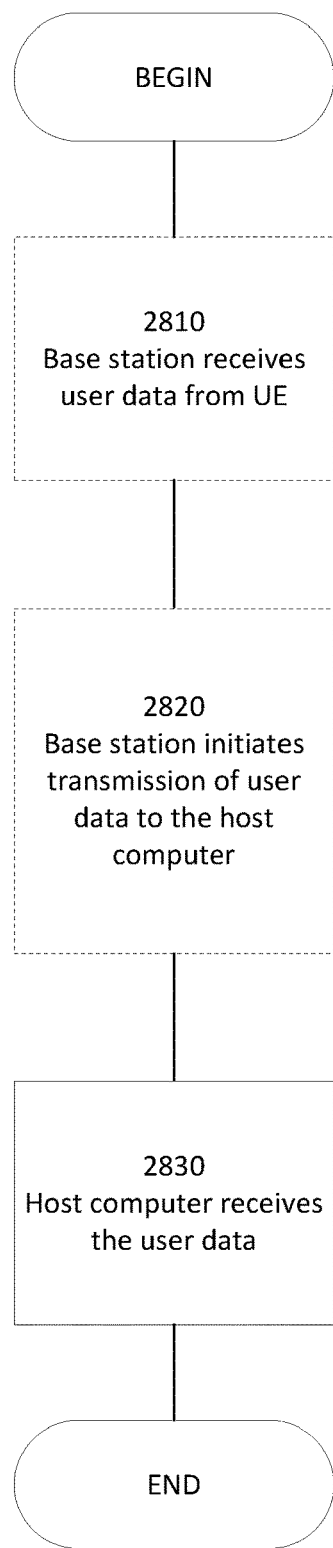
FIG. 28 is a flowchart illustrating a method implemented in a communication system, in accordance with one embodiment.

FIG. 28 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 28 will be included in this section. In step 2810 (which may be optional), in accordance with the teachings of the embodiments described throughout this disclosure, the base station receives user data from the UE. In step 2820 (which may be optional), the base station initiates transmission of the received user data to the host computer. In step 2830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by radio equipment for tap separated channel estimation in a wireless communication system, the method comprising:
    obtaining a channel estimate of a radio channel over which a reference signal is received;
    separating the channel estimate into channel estimate components that correspond to respective channel taps;
    compensating the channel estimate components for Doppler shifts respectively associated with the channel taps to which the channel estimate components correspond;
    processing the compensated channel estimate components separately, wherein said processing comprises filtering, interpolating, and/or extrapolating;
    de-compensating the processed channel estimate components for the respective Doppler shifts; and
    forming a combined channel estimate of the radio channel by combining the de-compensated channel estimate components.

2. The method of claim 1, further comprising estimating respective frequencies for the channel taps, and wherein said compensating comprises performing time-dependent phase rotation of the channel estimate components using the frequencies respectively estimated for the channel taps to which the channel estimate components correspond.

3. The method of claim 2, wherein performing time-dependent phase rotation of the channel estimate components comprises multiplying each channel estimate component for symbol n by a respective phase $e^{-i \cdot 2\pi \cdot (f_i^{est} - F_d) \cdot t_n}$, where $f_i^{est}$ is the frequency respectively estimated for the channel tap i to which the channel estimate component corresponds and $F_d$ is a frequency with which the received signal is down-converted to baseband.

4. The method of claim 1, wherein said separating comprises:
    obtaining an impulse response from the channel estimate;
    separating the impulse response into tap-specific impulse responses that respectively correspond to the channel taps; and
    obtaining the channel estimate components that respectively correspond to channel taps by transforming the tap-specific impulse responses into a frequency domain.

5. The method of claim 1, wherein said separating comprises applying tap separation filters, corresponding to the respective channel taps, to the channel estimate.

6. The method of claim 1, further comprising identifying the channel taps from an impulse response calculated based on the reference signal, or a different reference signal, received over the radio channel.

7. The method of claim 6, wherein the channel taps are identified from an impulse response calculated based on the different reference signal, wherein the different reference signal is a tracking reference signal, a channel state information reference signal, a sounding reference signal, or a cell-specific reference signal.

8. The method of claim 6, wherein said identifying comprises dividing a time interval of the impulse response into multiple time segments and treating one or more components of the impulse response corresponding to one or more of the time segments as one or more of the channel taps.

9. The method of claim 1, wherein at least one of the channel estimate components corresponds to multiple channel taps with Doppler shifts that differ from one another by an amount less than a threshold.

10. The method of claim 1, wherein the reference signal is a demodulation reference signal or a cell-specific reference signal.

11. The method of claim 1, further comprising demodulating a data signal using the combined channel estimate.

12. The method of claim 1, further comprising transmitting signaling indicating that the radio equipment is capable of:
    tap separated channel estimation;
    meeting a certain demodulation performance requirement while the radio equipment is moving at a speed within a certain range, wherein the radio equipment is configured to perform tap separated channel estimation while moving at a speed within the certain range; or
    performing channel estimation using a certain one of multiple possible reference signal patterns with different respective time domain reference symbol densities, wherein the radio equipment is configured to perform tap separated channel estimation when the reference signal received has the certain reference signal pattern.

13. The method of claim 1, further comprising receiving signaling indicating that the radio equipment is to:
    perform tap separated channel estimation;
    meet a certain demodulation performance requirement while the radio equipment is moving at a speed within a certain range, wherein the radio equipment is configured to perform tap separated channel estimation while moving at a speed within the certain range; or
    perform channel estimation using a certain one of multiple possible reference signal patterns with different respective time domain reference symbol densities, wherein the radio equipment is configured to perform tap separated channel estimation when the reference signal received has the certain reference signal pattern.

14. Radio equipment for tap separated channel estimation in a wireless communication system, the radio equipment comprising:
    communication circuitry; and
    processing circuitry configured to:
        obtain a channel estimate of a radio channel over which a reference signal is received;
        separate the channel estimate into channel estimate components that correspond to respective channel taps;
        compensate the channel estimate components for Doppler shifts respectively associated with the channel taps to which the channel estimate components correspond;
        process the compensated channel estimate components separately, wherein said processing comprises filtering, interpolating, and/or extrapolating;
        de-compensate the processed channel estimate components for the respective Doppler shifts; and
        form a combined channel estimate of the radio channel by combining the de-compensated channel estimate components.

15. The radio equipment of claim 14, wherein the radio equipment is a user equipment.

16. The radio equipment of claim 14, wherein the radio equipment is radio network equipment.

17. A method performed by radio network equipment configured for use in a wireless communication system, the method comprising:

receiving from a user equipment signaling indicating whether or not a user equipment has a certain capability, wherein the certain capability comprises:
- tap separated channel estimation in which the user equipment compensates channel estimate components for Doppler shifts respectively associated with channel taps to which the channel estimate components correspond and filters, interpolates, and/or extrapolates the compensated channel estimate components separately;
- meeting a certain demodulation performance requirement while the user equipment is moving at a speed within a certain range; or
- performing channel estimation using a certain one of multiple possible reference signal patterns with different respective time domain reference symbol densities; and determining, based on the received signaling and from multiple possible reference signal patterns with different respective time domain reference symbol densities, a reference signal pattern of a reference signal to transmit to the user equipment; and transmitting the reference signal with the determined reference signal pattern to the user equipment.

18. The method of claim 17, wherein said determining comprises determining that the reference signal is to have a reference signal pattern with a relatively lower or higher time domain reference symbol density depending respectively on whether or not the signaling indicates the user equipment has the certain capability.

19. Radio network equipment for tap separated channel estimation in a wireless communication system, the radio network equipment comprising:

communication circuitry; and
processing circuitry configured to:
- receive from a user equipment signaling indicating whether or not a user equipment has a certain capability, wherein the certain capability comprises:
  - tap separated channel estimation in which the user equipment compensates channel estimate components for Doppler shifts respectively associated with channel taps to which the channel estimate components correspond and filters, interpolates, and/or extrapolates the compensated channel estimate components separately;
  - meeting a certain demodulation performance requirement while the user equipment is moving at a speed within a certain range; or
  - performing channel estimation using a certain one of multiple possible reference signal patterns with different respective time domain reference symbol densities; and
- determine, based on the received signaling and from multiple possible reference signal patterns with different respective time domain reference symbol densities, a reference signal pattern of a reference signal to transmit to the user equipment; and
- transmit the reference signal with the determined reference signal pattern to the user equipment.

20. The radio equipment of claim 19, wherein the processing circuitry is configured to determine that the reference signal is to have a reference signal pattern with a relatively lower or higher time domain reference symbol density depending respectively on whether or not the signaling indicates the user equipment has the certain capability.

\* \* \* \* \*